(12) United States Patent
Churchill et al.

(10) Patent No.: US 10,642,827 B2
(45) Date of Patent: May 5, 2020

(54) PRESENTING ITEMS IN PARTICULAR PRESENTATION MODES

(71) Applicant: Microsoft Technology Licensing, LLC, Redmond, WA (US)

(72) Inventors: John E. Churchill, Monroe, WA (US); Joseph Wheeler, Sammamish, WA (US); Jérôme Jean-Louis Vasseur, Bothell, WA (US); Thomas R. Fuller, Seattle, WA (US); Jason D. Giles, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 338 days.

(21) Appl. No.: 15/676,369

(22) Filed: Aug. 14, 2017

(65) Prior Publication Data

US 2017/0371920 A1 Dec. 28, 2017

Related U.S. Application Data

(63) Continuation of application No. 14/154,010, filed on Jan. 13, 2014, now Pat. No. 9,910,884.

(51) Int. Cl.
| | | |
|---|---|---|
| *G06F 3/0484* | (2013.01) | |
| *G06F 3/048* | (2013.01) | |
| *G06F 16/24* | (2019.01) | |
| *G06F 3/0481* | (2013.01) | |
| *G06F 16/00* | (2019.01) | |
| *G06F 3/14* | (2006.01) | |

(52) U.S. Cl.
CPC .......... *G06F 16/24* (2019.01); *G06F 3/04817* (2013.01); *G06F 3/04842* (2013.01); *G06F 16/00* (2019.01); *G06F 2203/04803* (2013.01)

(58) Field of Classification Search
None
See application file for complete search history.

(56) References Cited

U.S. PATENT DOCUMENTS

| | | | |
|---|---|---|---|
| 5,438,661 | A | 8/1995 | Ogawa |
| 5,892,511 | A | 4/1999 | Gelsinger et al. |
| 6,025,842 | A | 2/2000 | Filetto et al. |
| 6,239,798 | B1 | 5/2001 | Ludolph et al. |
| 6,300,951 | B1 | 10/2001 | Filetto et al. |
| 6,523,048 | B2 | 2/2003 | DeStefano |

(Continued)

FOREIGN PATENT DOCUMENTS

WO 2014165976 A1 10/2014

OTHER PUBLICATIONS

Samsung Galaxy Note 3 User Guide, Sep. 7, 2013, 13 pages (Year: 2013).*

(Continued)

*Primary Examiner* — Yongjia Pan
(74) *Attorney, Agent, or Firm* — Rainier Patents, P.S.

(57) ABSTRACT

Functionality is described herein for presenting representations of the z most recently presented items. The functionality also presents indicators which convey the presentation modes that were last used to present the z items. When the user selects one of the z items, the functionality presents it, as a default, using the last-used presentation mode, as conveyed by the indicator associated with this item. In one particular case, the last-used presentation mode corresponds to a full mode or a snap mode.

20 Claims, 24 Drawing Sheets

(56) References Cited

U.S. PATENT DOCUMENTS

| | | | |
|---|---|---|---|
| 6,590,594 B2 | 7/2003 | Bates et al. |
| 6,639,606 B1 | 10/2003 | Choi |
| 6,710,788 B1 | 3/2004 | Freach et al. |
| 6,781,611 B1 | 8/2004 | Richard |
| 7,028,264 B2 | 4/2006 | Santoro et al. |
| 7,346,855 B2 | 3/2008 | Hellyar et al. |
| 7,350,154 B2 | 3/2008 | Anderson et al. |
| 8,028,247 B2 | 9/2011 | Haynes |
| 8,060,560 B2 | 11/2011 | Vonog et al. |
| 8,245,154 B2 | 8/2012 | Karstens |
| 8,271,891 B1 | 9/2012 | Osbourn et al. |
| 8,341,541 B2 | 12/2012 | Holecek et al. |
| 8,368,616 B1 | 2/2013 | Harris |
| 8,504,937 B2 | 8/2013 | Jobs et al. |
| 8,525,808 B1 | 9/2013 | Buening |
| 8,683,362 B2 | 3/2014 | Shiplacoff et al. |
| 8,881,048 B2 | 11/2014 | Bakhash |
| 9,456,169 B2 | 9/2016 | Wang et al. |
| 9,588,674 B2 | 3/2017 | Strutin-Belinoff et al. |
| 9,612,673 B2 | 4/2017 | Lavallee |
| 10,083,047 B2* | 9/2018 | Kim | G06F 9/44505 |
| 2003/0013483 A1 | 1/2003 | Ausems et al. |
| 2003/0117440 A1 | 6/2003 | Hellyar et al. |
| 2004/0153973 A1 | 8/2004 | Horwitz |
| 2004/0193699 A1 | 9/2004 | Heymann et al. |
| 2004/0237049 A1 | 11/2004 | Pletcher et al. |
| 2005/0149879 A1 | 7/2005 | Jobs et al. |
| 2005/0198585 A1 | 9/2005 | Haynes |
| 2006/0020903 A1 | 1/2006 | Wang et al. |
| 2006/0095845 A1 | 5/2006 | Van Leeuwen |
| 2006/0161847 A1 | 7/2006 | Holecek et al. |
| 2006/0248471 A1 | 11/2006 | Lindsay et al. |
| 2007/0192726 A1 | 8/2007 | Kim et al. |
| 2007/0250787 A1 | 10/2007 | Kawahara et al. |
| 2008/0109753 A1 | 5/2008 | Karstens |
| 2009/0094523 A1 | 4/2009 | Treder et al. |
| 2009/0327953 A1 | 12/2009 | Honkala et al. |
| 2010/0064251 A1 | 3/2010 | Hufnagel et al. |
| 2010/0066698 A1 | 3/2010 | Seo |
| 2010/0081475 A1 | 4/2010 | Chiang et al. |
| 2010/0088634 A1 | 4/2010 | Tsuruta et al. |
| 2010/0095240 A1 | 4/2010 | Shiplacoff et al. |
| 2010/0248788 A1 | 9/2010 | Yook et al. |
| 2011/0099512 A1 | 4/2011 | Jeong |
| 2011/0107272 A1 | 5/2011 | Aguilar |
| 2011/0113363 A1 | 5/2011 | Hunt et al. |
| 2011/0138314 A1 | 6/2011 | Mir et al. |
| 2011/0144970 A1* | 6/2011 | Jiang | G06F 13/105 |
| | | | 703/24 |
| 2011/0161868 A1 | 6/2011 | Green et al. |
| 2011/0175930 A1 | 7/2011 | Hwang et al. |
| 2012/0005602 A1 | 1/2012 | Anttila et al. |
| 2012/0042286 A1 | 2/2012 | Sullivan et al. |
| 2012/0081267 A1 | 4/2012 | Sirpal et al. |
| 2012/0174020 A1 | 7/2012 | Bell et al. |
| 2012/0290966 A1* | 11/2012 | Chae | G09G 5/14 |
| | | | 715/778 |
| 2012/0290978 A1 | 11/2012 | Devecka |
| 2012/0290979 A1 | 11/2012 | Devecka |
| 2012/0304106 A1 | 11/2012 | LeVee et al. |
| 2012/0304108 A1 | 11/2012 | Jarrett et al. |
| 2012/0320984 A1 | 12/2012 | Zhou |
| 2013/0031618 A1 | 1/2013 | Momchilov |
| 2013/0120447 A1 | 5/2013 | Kim et al. |
| 2013/0138810 A1 | 5/2013 | Binyamin et al. |
| 2013/0145286 A1 | 6/2013 | Feng et al. |
| 2013/0187861 A1 | 7/2013 | Lavallee |
| 2013/0218464 A1 | 8/2013 | Chen |
| 2013/0290887 A1 | 10/2013 | Sun et al. |
| 2013/0300684 A1 | 11/2013 | Kim et al. |
| 2013/0305184 A1* | 11/2013 | Kim | G06F 3/0481 |
| | | | 715/781 |
| 2013/0346912 A1 | 12/2013 | Buening |
| 2014/0013271 A1 | 1/2014 | Moore et al. |
| 2014/0075394 A1 | 3/2014 | Nawle et al. |
| 2014/0085188 A1 | 3/2014 | Kim et al. |
| 2014/0089832 A1* | 3/2014 | Kim | G06F 3/0481 |
| | | | 715/769 |
| 2014/0157163 A1 | 6/2014 | Strutin-Belinoff et al. |
| 2014/0157173 A1 | 6/2014 | Takayama |
| 2014/0164957 A1 | 6/2014 | Shin et al. |
| 2014/0164966 A1 | 6/2014 | Kim et al. |
| 2014/0201679 A1 | 7/2014 | Desai et al. |
| 2014/0229888 A1 | 8/2014 | Ko et al. |
| 2014/0351722 A1 | 11/2014 | Frederickson et al. |
| 2014/0351748 A1* | 11/2014 | Xia | G06F 3/0481 |
| | | | 715/798 |
| 2014/0365933 A1 | 12/2014 | Wu |
| 2015/0074589 A1 | 3/2015 | Pan et al. |
| 2015/0113455 A1 | 4/2015 | Kang et al. |
| 2015/0169699 A1 | 6/2015 | Gilbert et al. |
| 2015/0185980 A1* | 7/2015 | An | G06F 3/0482 |
| | | | 715/803 |
| 2015/0199085 A1 | 7/2015 | Churchill et al. |
| 2015/0199086 A1 | 7/2015 | Churchill et al. |
| 2016/0071491 A1* | 3/2016 | Berryman | G06F 3/0484 |
| | | | 345/173 |

OTHER PUBLICATIONS

Nick Sutrich, How-To: Samsung Galaxy Note 3 Multi-View, Oct. 8, 2013, 6 pages (Year: 2013).*

"Cornerstone—Android Multi-Tasking", Retrieved From: https://web.archive.org/web/20131023083100/http://onskreen.com:80/cornerstone/, Retrieved on: Mar. 3, 2018, 2 Pages.

"Cornerstone—Running on Ice Cream Sandwich!", Retrieved From: https://www.youtube.com/watch?v=qX8w3UZIjkc, Dec. 15, 2011, 1 Page.

Umar, "DualWeb Browser: Android Split Screen Browsing App", Retrieved From: https://www.makeuseof.com/tag/dualweb-browser-android-split-screen/, Jun. 24, 2011, 2 Pages.

"Onskreen—Cornerstone New Features Demo", Retrieved From: https://www.youtube.com/watch?v=QCpEKnUuGXY, Jun. 13, 2011, 1 Page.

Yasere, "Onskreen Cornerstone for True Multitasking", Retrieved From: https://forum.xda-developers.com/showthread.php?t=1490696, Feb. 10, 2012, 4 Pages.

"Onskreen Opensources It's Cornerstone App. Multiple Windows Son Android! Get It Nao", Retrieved From: https://www.reddit.com/r/Android/comments/phl3h/onskreen_opensources_its_cornerstone_app_multiple/, Feb. 9, 2012, 7 Pages.

"Windowed Multitasking: Cornerstone by Onskreen", Retrieved From: http://forum.brighthand.com/threads/windowed-multitasking-cornerstone-by-onskreen.286981/, Oct. 2, 2015, 5 Pages.

"Final Office Action Issued in U.S. Appl. No. 14/154,037", dated Mar. 29, 2018, 16 Pages.

"Fast App Resume for Windows Phone 8", Retrieved from <<https://msdn.microsoft.com/library/windows/apps/jj735579(v=vs.105).aspx>>, Feb. 3, 2014, 8 Pages.

"Productivity Apps", Retrieved from <<https://web.archive.org/web/20140622042905/http://msdn.microsoft.com/en-us/library/windows/apps/hh868273.aspx>>, Jan. 4, 2014, 18 Pages.

"Windows 8: Applications—Snapping", Retrieved from <<https://web.archive.org/web/20140601022505/http://mscerts.programming4.us/windows/windows%208%20%20%20applications%20-%20snapping.aspx>>, Jul. 15, 2013, 3 Pages.

"Final Office Action Issued in U.S. Appl. No. 14/154,010", dated Dec. 20, 2016, 19 Pages.

"Non Final Office Action Issued in U.S. Appl. No. 14/154,010", dated Aug. 1, 2016, 15 Pages.

"Notice of Allowance Issued in U.S. Appl. No. 14/154,010", dated May 18, 2017, 10 Pages.

"Applicant Initiated Interview Summary Issued in U.S. Appl. No. 14/154,037", dated Apr. 18, 2017, 4 Pages.

"Final Office Action Issued in U.S. Appl. No. 14/154,037", dated Feb. 14, 2017, 25 Pages.

"Non Final Office Action Issued in U.S. Appl. No. 14/154,037", dated Aug. 30, 2017, 25 Pages.

(56) References Cited

OTHER PUBLICATIONS

"Non Final Office Action Issued in U.S. Appl. No. 14/154,037", dated Sep. 29, 2016, 19 Pages.
"Response to Final Office Action Filed in U.S. Appl. No. 14/154,037", filed May 12, 2017, 10 Pages.
"Response to Non Final Office Action Filed in U.S. Appl. No. 14/154,037", filed Nov. 11, 2016, 12 Pages.
Wallen, Jack, "Learn How to Multitask on the Samsung Galaxy Note II", Retrieved from <<http://www.techrepublic.com/blog/smartphones/learn-how-to-multitask-on-the-samsung-galaxy-note-ii/>>, Jan. 3, 2013, 10 Pages.
Acevedo, Paul, "Xbox One Reveal Day Wrap-Up: All you need to know", Retrieved from <<https://www.windowscentral.com/xbox-one-reveal-summary>>, May 21, 2013, 27 Pages.
Geffchang, Donald, "How Do I Add Other Apps to Samsung's Multi-window/sliding App in Android 4.1.2?", Retrieved from <<https://android.stackexchange.com/questions/50479/how-do-i-add-other-apps-to-samsungs-multi-window-sliding-app-in-android-4-1-2>>, Aug. 3, 2013, 2 Pages.
Kozuch, et al., "Internet Suspend/Resume", In Proceedings of the 4th IEEE Workshop on Mobile Computing Systems and Applications, Jun. 2002, 8 Pages.
Stern, Joanna, "8 Things You Need to Know About Using Windows 8", Retrieved from <<http://abcnews.go.com/Technology/windows-things-microsofts-os/story?id=17570782>>, Oct. 26, 2012, 5 Pages.
Thurrott, Paul, "Why Doesn't Windows 8 Just Look Like This? (Take Two)", Retrieved from <<https://web.archive.org/web/20121207070901/http://winsupersit.com/windows-8/why-doesnt-windows-8-just-look-take-two>>, Apr. 26, 2012, 8 Pages.

\* cited by examiner

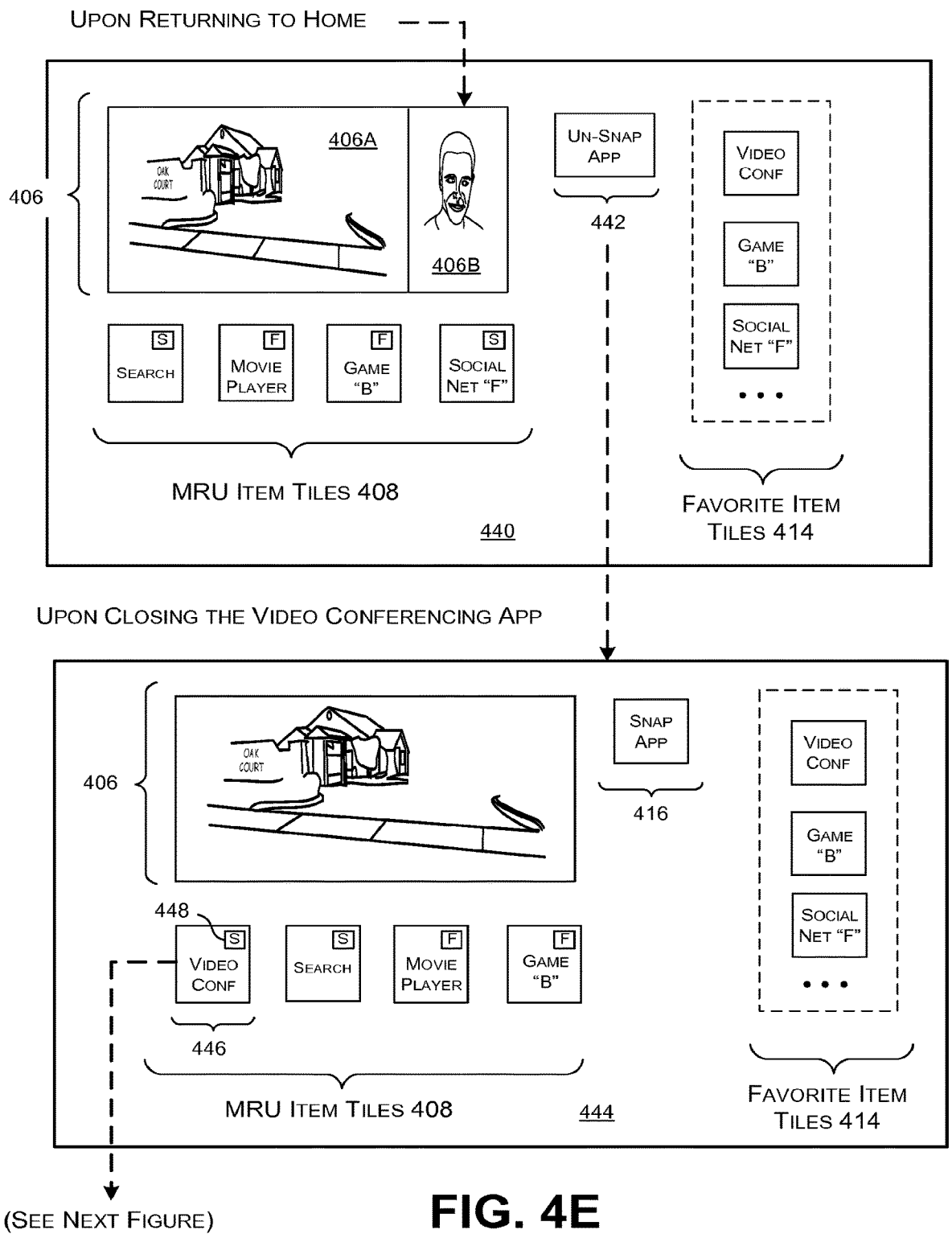

PRESENTING ITEMS IN PARTICULAR PRESENTATION MODES

BACKGROUND

Known multi-tasking technology increases the ease at which a user may transition from one application to another. For example, a traditional personal computing device may allow a user to interact with two applications via two respective display panels, which the computing device presents at the same time. However, multi-tasking technology also increases the overall complexity of information that is presented to the user at any one time. This complexity can potentially overwhelm a user, negatively affecting his or her user experience. A user, for instance, may have difficulty understanding how to navigate among presentable items.

SUMMARY

Functionality is described herein for interacting with items, such as games, music, applications of various types, etc. In one implementation, the functionality operates by presenting representations of the z items that have been most recently presented to a user. The functionality further presents, for at least one such item, an indicator that conveys a presentation mode in which that item was most recently presented to the user.

According to another illustrative aspect, the functionality further operates by receiving a user's election of one of the representations associated with the z items. The functionality then presents an output associated with the selected item in the same presentation mode in which the selected item was last presented (as reflected by the indicator associated with the selected item).

According to another illustrative aspect, the presentation mode for a chosen item may correspond to a full mode or a snap mode. In the full mode, the functionality presents the output of the chosen item in a primary display region. In the snap mode, the functionality presents the output of the chosen item in a secondary display region. The secondary display region may be less prominent than the primary display region, e.g., corresponding to a side display portion of a split-screen output presentation.

According to another illustrative aspect, the functionality presents the representations of the z items as z respective tiles in a homepage presentation.

According to another illustrative aspect, the functionality further allows a user to select a new presentation mode for a selected item. That new presentation mode may differ from the presentation mode in which the selected item was most recently presented. For example, a user may select the new presentation mode via a context menu or the like. The context menu presents a set of presentation modes which are possible for the selected item.

According to another illustrative aspect, when the user selects a new item, the functionality can store information which conveys: (a) an indication that the new item is the most recent item that has been presented; and (b) the particular presentation mode in which the new item has been presented. The functionality may store that information in both a local data store and a remote data store.

According to another illustrative aspect, the functionality can retrieve the above-specified stored information from the remote data store when the user "roams" to a new user device, which does not yet store the information in its local store.

The above-summarized functionality confers various benefits to users. In one non-limiting implementation, for instance, the functionality facilitates a user's interaction with a game console, e.g., by allowing a user to conveniently transition among different kinds of items that may be presented via the game console.

The above approach can be manifested in various types of systems, devices, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 4A-4F and 5-9 show illustrative output presentations that can be provided by the computer system of FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative computer system for managing the presentation of items. Section B sets forth illustrative methods which explain the operation of the computer system of Section A. Section C describes illustrative computing functionality that can be used to implement any aspect of the features described in Sections A and B.

This application is related to U.S. patent application Ser. No. 14/154,037, entitled "Identifying and Launching Items Associated with a Particular Presentation Mode," and naming the inventors of John E. Churchill, et al. That application is incorporated here by reference.

Figure 20:
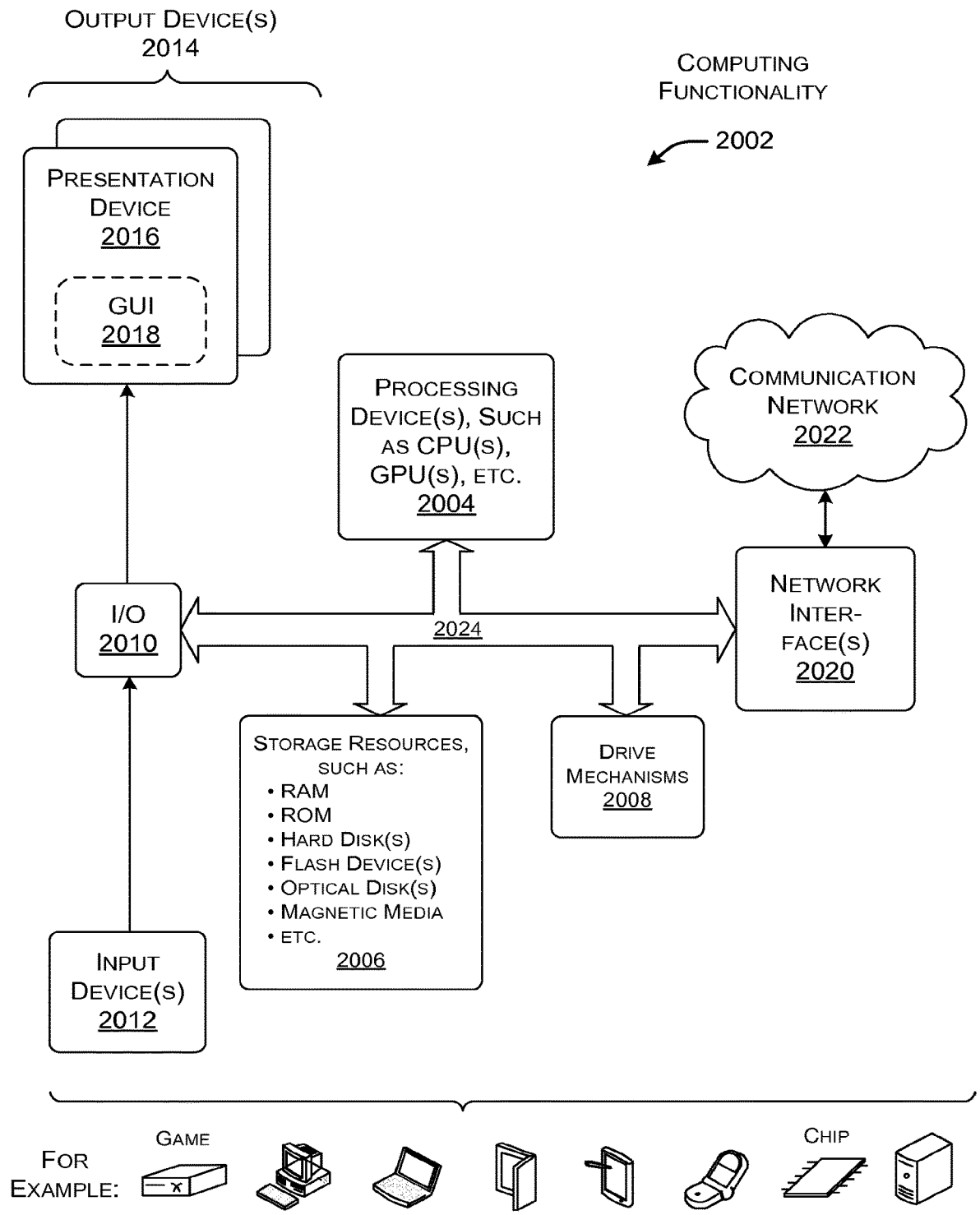
FIG. 20 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 20, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations.

A. Illustrative Computer System

A.1. Overview of the Computer System

Figure 1:
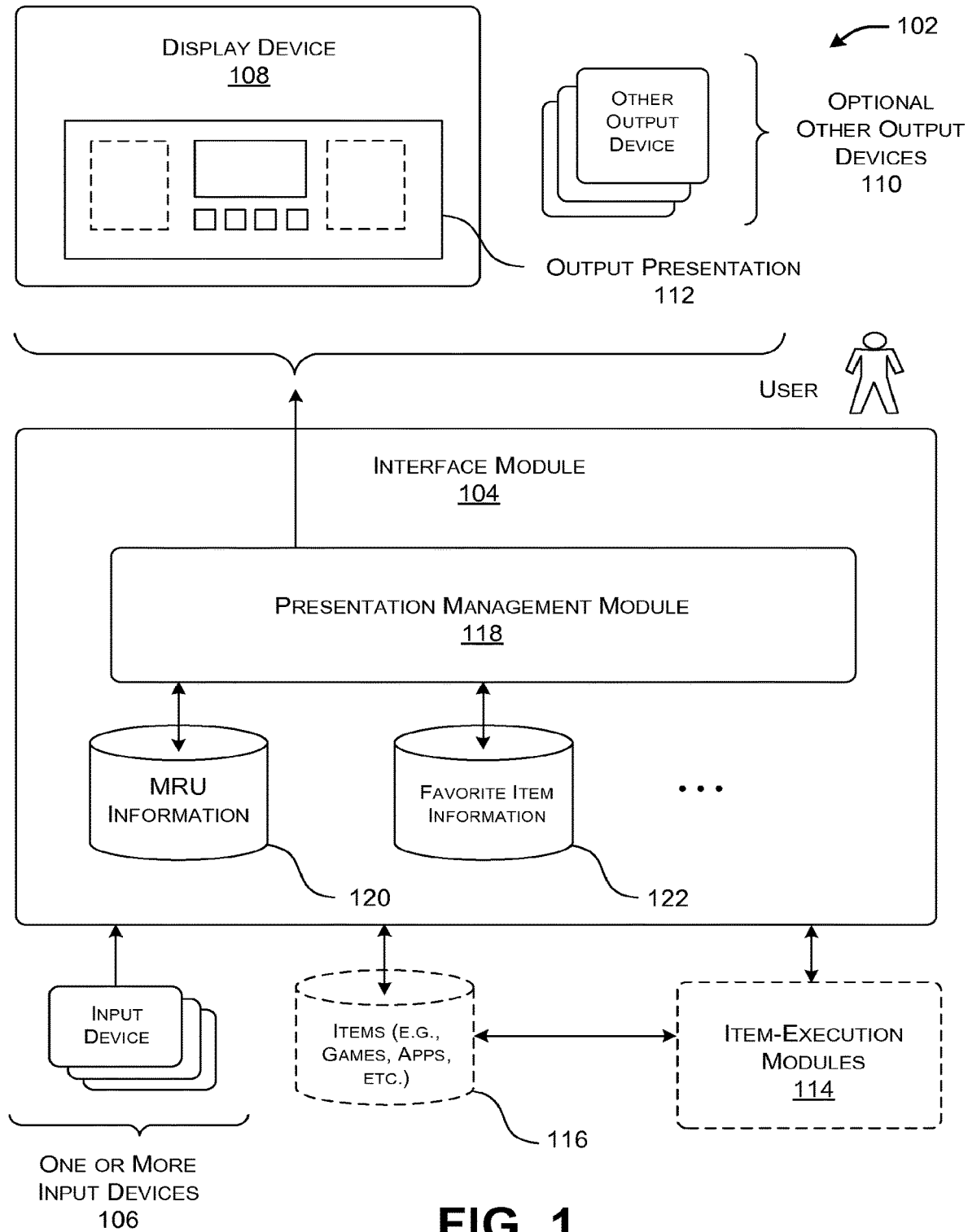
FIG. 1 shows a computer system for managing the presentation of items, such as applications of various types.

FIG. 1 shows a logical overview of a computer system 102 for managing a user's interaction with items. As the term is used herein, an "item" corresponds to any unit of instructions, data, etc. that can be processed by the computer system 102 to deliver an output presentation to the user. For example, without limitation, a particular item may correspond to an application of any type (e.g., a game, a movie player, a music player, a communication application, a social network application, a search application, and so on). Alternatively, or in addition, a particular item may correspond to a piece of content, such as a movie, a song, a document, etc. Alternatively, or in addition, a particular item may correspond to an application in conjunction with a piece of content, such as a movie player which is playing a particular movie, and so on. To simplify the explanation, however, it will henceforth be assumed that the items correspond to respective applications.

In one implementation, the computer system 102 comprises at least a game console. Users interact with the game console for the primary purpose of playing computer games. In this context, the computer system 102 allows a user to integrate other (non-game) application experiences into his or her game play in an efficient and enjoyable manner. However, the computer system 102 is not limited to game consoles. In another case, for example, the computer system 102 may be centered around the use of a general purpose personal computer, a set-top box, a mobile computing device of any type, and so on.

By way of overview, the computer system 102 includes an interface module 104 that handles a user's interaction the computer system 102. More specifically, the interface module 104 receives input information from one or more input devices 106. Without limitation, the input devices 106 may include any of: game controllers of any type; keypad input devices; joy sticks; mouse devices; touchscreen input mechanisms; voice recognition functionality; movement sensing devices (such as accelerometers, gyroscopes, etc.); body pose tracking mechanisms (such as the Kinect™ device produced by Microsoft® Corporation, of Redmond, Wash.); electrodermal input mechanisms; physiological input mechanisms, and so on. The interface module 104 delivers output information to one or more output devices, including a representative display device 108 (such as a television screen) and/or one or more other output devices 110 of any nature (such as speakers, printers, haptic output devices, hologram-generating devices, physical model-generating mechanisms, etc.).

At any given time, the interface module 104 formulates output information into an output presentation. For instance, in the visual realm, the interface module 104 presents a visual output presentation 112 for output to the display device 108. Later figures provide examples of various sequences of visual output presentations that the computer system 102 may generate to allow the user to transition among items.

The computer system 102 may include other modules 114 for executing or otherwise processing a collection of items stored in one or more data stores 116. For example, one such module may correspond to a game-playing platform for executing a game application. The data stores 116 may correspond to any combination of local data stores and/or remote data stores. In the case of executable items, the data stores 116 store the computer-executable instructions associated with the items.

The interface module 104 itself may include a presentation management module 118 for managing the user's interaction with the items (some of which may be stored in the data stores 116). From a very high level standpoint, the presentation management module 118 allows a user to discover items that may be selected, to activate items, to pause items, to close items, to transition among items, and so on.

As will be discussed in detail in the ensuing explanation, the presentation management module 118 also allows a user to select a presentation mode for each item that is presented. As the term is used herein, a presentation mode refers to the user interface technique that the computer system 102 uses to present an item to the user. The presentation mode may be characterized, for instance, by one or more of: (a) the size of a (visual) presentation; (b) the position of the (visual) presentation within a display space; (c) the device(s) that are used to present the presentation; (d) the manner in which the presentation affects another ongoing presentation; (e) video and/or audio settings that affect the presentation (such as contrast, color, transparency, volume, etc.); (f) the manner in which the information associated with the presentation is archived (if at all); (g) the security applied to the presentation, and so on.

In performing its functions, the presentation management module 118 may rely on most-recently-used (MRU) information stored in a data store 120. The MRU information identifies, for each user: (a) a set of n items that were mostly recently presented by the computer system 102 to the user; and (b) for at least some of the n items, the presentation modes that were used to present the n items to the user.

The presentation management module 118 may also rely on a data store 122 that stores favorite item information. The favorite item information corresponds to information that an individual user (or group of users) has designated as favorites. More generally, the presentation management module 118 may allow the user to interact with one or more collections of items. In some cases, a user may specify the items in a collection based on any criteria. In another case, some entity other than the user may specify the items in a collection.

Figure 2:
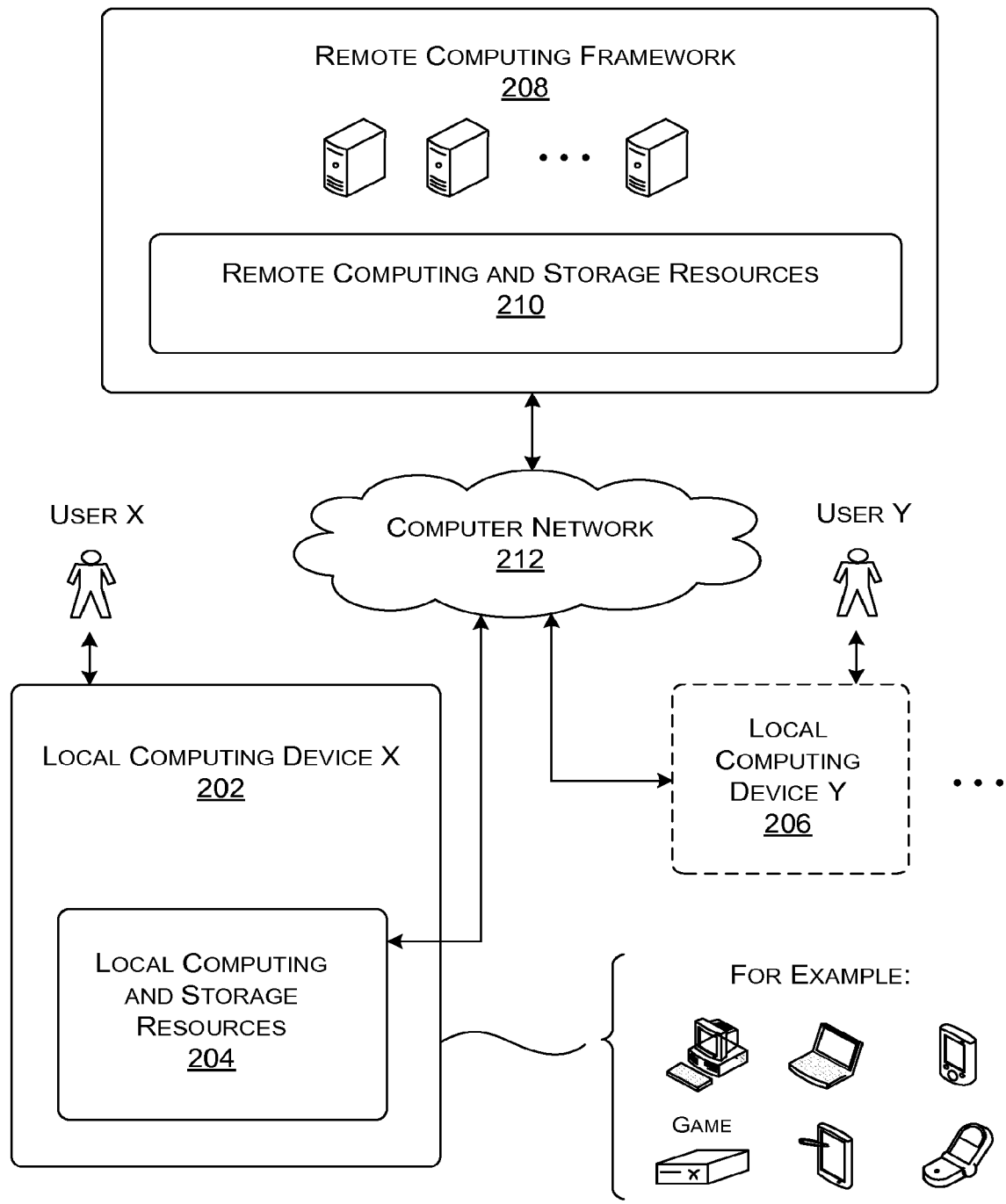
FIG. 2 shows equipment that can be used to implement the computer system of FIG. 1, according to one implementation.

FIG. 2 shows one implementation of the computer system 102 of FIG. 1. That implementation includes a local computing device 202 with which a user "X" may interact. The local computing device 202, for instance, may correspond to a game console, a set-top box, a personal computing device of any type, a mobile computing device of any type, and so on. The local computing device 202 performs its functions using local computing and storage resources 204.

More generally stated, FIG. 1 shows the computer system 102 as it relates to a single user who is interacting with the computer system 102. But more generally, as shown in FIG. 2, the computer system 102 may encompass plural local computing devices through which plural users may interact with items. For example, FIG. 2 shows another local computing device 206 with which another user "Y" may interact. A single user (e.g., user "X") may also interact with his or her account via two or more local computing devices, e.g., by submitting appropriate credentials to log into his her account on each machine.

Each local computing device (e.g., local computing devices 202, 206, etc.) may interact with a remote computing framework 208. The remote computing framework 208 may use remote computing and storage resources 210 to implement one or more functions of the computing system 102. For example, the remote computing framework 208 can store various types of information in a central repository (such as account information, score information, MRU information etc.), which allows users to access this information via different local computing devices. Further, the computer system 102 may allocate certain resource-intensive computations to the remote computing framework 208 to reduce the processing burden placed on individual local computing devices. In one physical implementation, the remote computing framework 208 may correspond to one or more server computing devices and associated data stores.

A computer network 212 may couple together the above-described components, e.g., by allowing the local computing devices (202, 206) to communicate with the remote computing framework 208. The computer network 212 may represent a local area network, a wide area network (e.g., the Internet), point-to-point links, or any combination thereof.

Figure 3:
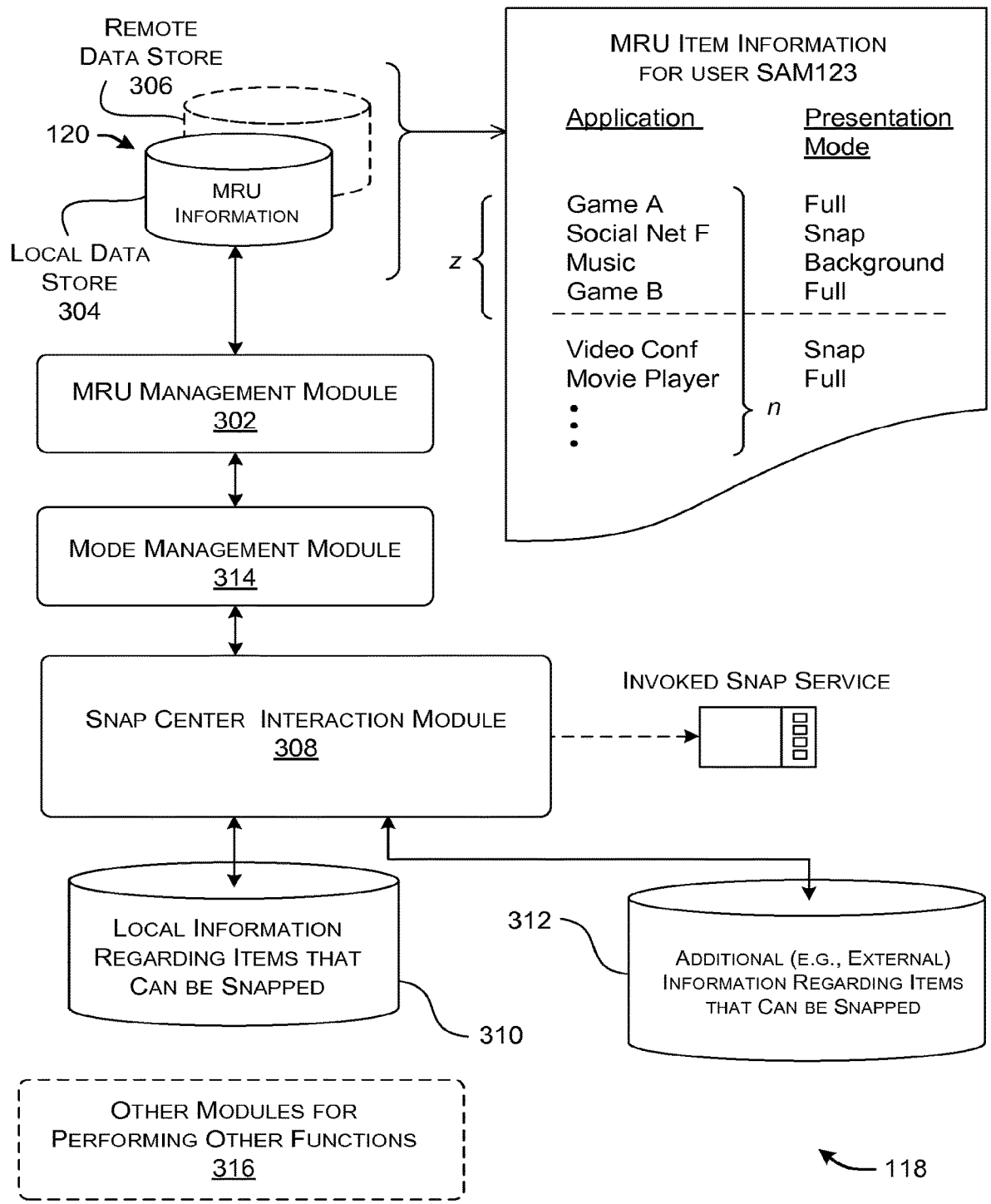
FIG. 3 shows one implementation of a presentation management module, which is a component of the computer system of FIG. 1.

FIG. 3 presents further details of one logical implementation of the presentation management module 118 of FIG. 1. To begin within, the presentation management module 118 includes an MRU management module 302 for managing the storage and presentation of most-recently-used (MRU) information. In one implementation, the MRU management module 302 performs these functions for each user, e.g., by maintaining an instance of MRU information for each user, and presenting that MRU information to the user when he or she interacts with the computer system 102. As noted above, the MRU information for each user describes the n items that were most recently presented to the user via the computer system 102.

More specifically, the MRU management module 302 performs at least two tasks. First, the MRU management module 302 updates a user's MRU information each time an item is presented to the user. More specifically, the MRU management module 302 may store: (a) an indication that the item was the last-viewed item that the user consumed; and (b) an indication of the presentation mode that was used to present the item to the user.

FIG. 3 shows an excerpt of MRU information that is maintained by the computer system 102 for a hypothetical user, identified by the alias SAM 123. That information indicates that the computer system 102 presented a game "A" in a full mode. Before that, the computer system 102 presented a social network "F" application in a snap mode, and so on. The meaning of the concepts "full mode" and "snap mode" will be explained in the next subsection; at this point, suffice it to say that the full mode and the snap mode correspond to two presentation modes.

In one case, the MRU management module 302 can manage the instance of MRU information as a first-in-first-out (FIFO) buffer. At any given time, the MRU management module 302 may store the last n items that were presented. The number n may correspond to any implementation-specific number selected by an application developer (or a user, if permitted), such as the last 20 items, 50 items, 100 items, etc. The MRU management module 302 effectively deletes an entry in the list when it reaches position n+1, and thereby "falls" off the list.

The MRU management module 302 may store the MRU information in the data store 120. The data store 120, in turn, may represent a local data store 304 and a remote data store 306. The local store is local with respect to whatever device that the user is using to interact with the MRU information. The remote store is remote with respect to the local device, and may correspond to a storage resource provided by the remote computing framework 208 of FIG. 2. In one case, the MRU management module 302 duplicates whatever information that it stores in the local data store 304 in the remote data store 306; this enables the user to access the MRU information while using a different local computing device (corresponding to any computing device other than the device that created the MRU information).

As another function, the MRU management module 302 presents the MRU information to the user. In one case, the MRU management module 302 reveals the MRU information to the user when the user visits a homepage or the like. A homepage corresponds to a hub interface through which other pages may be accessed. However, in other implementations, the MRU management module 302 can expose the MRU information to the user in different ways. For example, the MRU management module 302 can also provide the MRU information on plural different pages, e.g., in a dedicated peripheral region of these pages. Or the MRU management module 302 can present the MRU information via a drop-down menu selection, or in response to a voice command, and so on.

More precisely stated, the MRU management module 302 may operate by displaying information regarding the z most recently presented items, e.g., corresponding to the z top entries in the list of n items described above. For example, in the non-limiting case illustrated in the figures, z is 4, but z can correspond to any number selected by an application developer or user.

The MRU management module 302 can also rely on one or more additional factors to determine what MRU information to present to the user. For example, the MRU management module 302 may maintain a to-be-excluded list of items. The MRU management module 302 can consult this list prior to displaying the MRU information, and prevent any item from appearing in the set of z most recently used items if it appears in this list, even though it otherwise meets the criteria for being presented. If an item is excluded, the MRU management module 302 can pull another item off the top of the list of n most recently used items to fill the $z^{th}$ slot.

A snap center interaction module 308 presents information to the user regarding a collection of items that are capable of being presented in a particular presentation mode. In one case, the snap center interaction module 308 presents information regarding items that can be presented in a snap mode. Again, the meaning of the concept "snap mode" will be set forth below. In one case, the listing produced by the snap center interaction module 308 can exclude those items that cannot be presented in the designated presentation mode—e.g., that cannot be presented in the snap presentation mode.

To perform the above function, the snap center interaction module 308 can access a local data store 310. In one implementation, the local data store 310 may store information regarding items that are locally stored (e.g., on the user's game console or other computing device), where those items are capable of being presented in the snap mode. The computing device, in turn, may actively produce the entries in the data store 310 by performing a filtering operation, e.g., by identifying the subset of items that are currently installed on the computing device that can be presented in the snap mode.

The snap center interaction module 308 may also include a prompt that invites the user to obtain information about additional items that can be presented in the snap mode, but are not currently represented by the initial list of items. If the user activates this prompt, the snap center interaction module 308 can access a supplemental data store 312. In one implementation, the supplemental data store 312 may store information regarding items that are remotely stored (e.g., on the remote computing framework 208 of FIG. 2), where those items are capable of being presented in the snap mode. If the user selects one of those remotely stored items, the computing system 102 can download it to the user's local computing device.

In one implementation, the snap center interaction module 308 itself represents an application that can be executed by the computing system 102 to provide output information. More specifically, the snap center interaction module 308 itself represents a type of application that can be presented in the snap mode. The above statements will be clarified in the explanation provided in Subsection A.2 (below).

The snap center interaction module 308 can also formulate the collection of items based on one or more additional factors (that is, in addition to whether the items are capable of being presented in the snap mode). For example, the snap center interaction module 308 can omit items from the collection if they appear in a to-be-excluded list, maintained by the snap center interaction module 308. In addition, or alternatively, the snap center interaction module 308 can order the items in the collection of items based on at least one ordering criterion. For example, the snap center interaction module 308 can order the items based on how recently they have been viewed by the particular user who is currently interacting with the computing device, and/or the frequency at which the items have been viewed by the user (or by all users or a group of users), and so on. In addition, or alternatively, the snap center interaction module 308 can highlight one or more items in the collection based on any factor or factors (to be described in greater detail below).

A mode management module 314 controls the mode that the computer system 102 uses to present output information to the user at any given time, such as by displaying the output information in the full mode, snap mode, etc. To perform this function, the mode management module 314 interacts with at least the MRU management module 302 and the snap center interaction module 308.

FIG. 3 also includes a generically-labeled box, "other modules" 316. This box indicates that the presentation management module 118 may include any number of addition functional modules, but where those modules are not relevant to the present focus of this disclosure.

A.2. Illustrative User Experience

FIGS. 4A-4F, 5-11, 12A, 12B, and 13 show various sequences of output presentations that the computer system 102 may produce. The various features that appear in the output presentations are presented by way of exemplary illustration, not limitation. That is, any aspect of these presentations can be changed, including the selection of parts in those presentations, the arrangement of the parts, the appearance of the parts, the behavior of the parts, and so on.

Figure 4A:
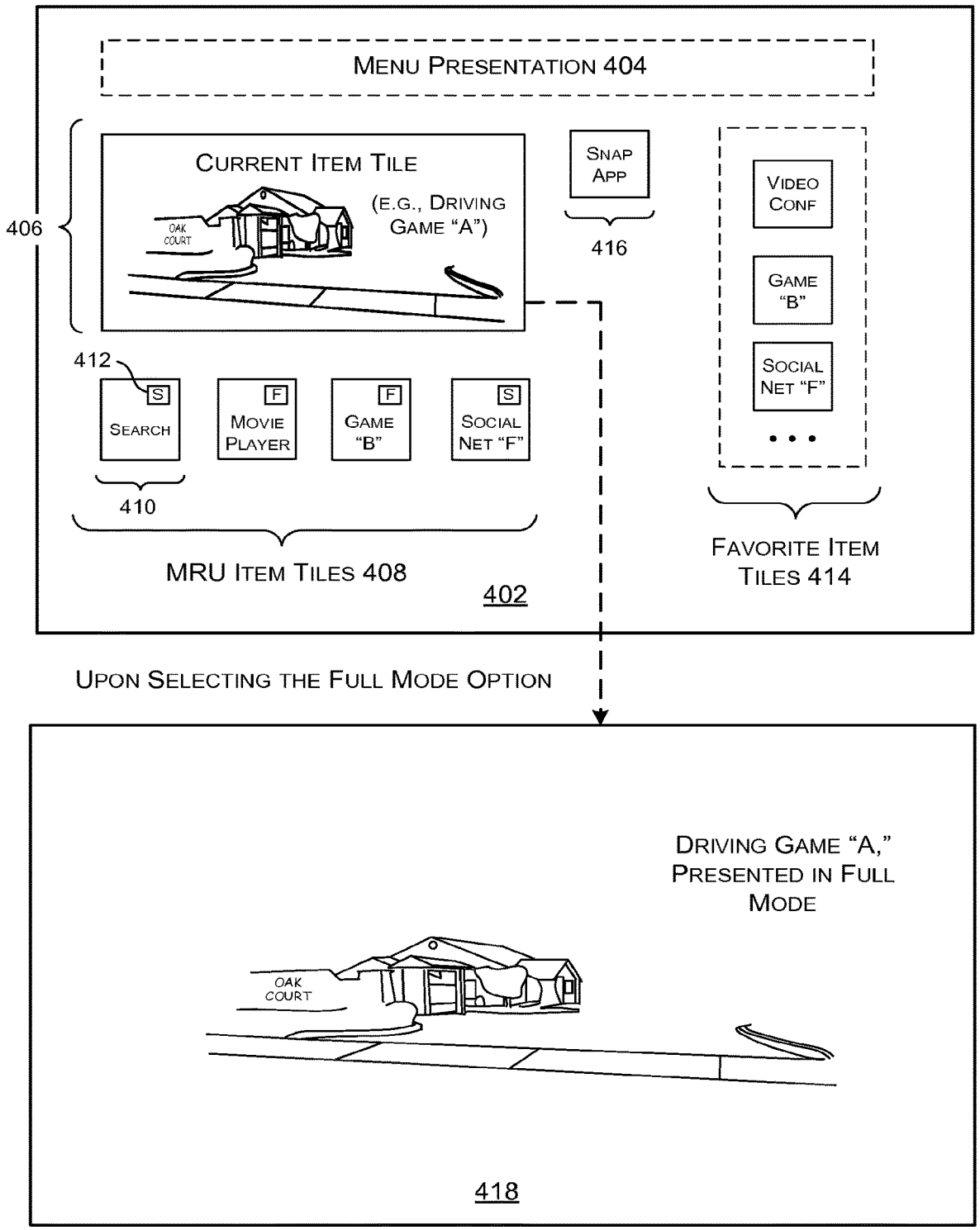

To begin with, FIG. 4A shows an output presentation 402 generated by a computing device (such as local computing device 202 of FIG. 2) when a user visits a homepage. In one illustrative implementation, the user may access the homepage by activating a hard button on a controller (not shown), a soft control on an output presentation, and/or by using some other technique. In the non-limiting example shown, the output presentation 402 includes an optional menu presentation 404 through which the user may access various functions and features. To simplify explanation, the menu presentation 404 is omitted from subsequent drawings.

The output presentation 402 includes a representation of an item that is currently being consumed by the user—in this case, a driving game labeled "A." The computing device uses a current item tile 406 to represent this item. For example, the current item tile 406 may present a snapshot of the output generated by the driving game "A" at a particular time, e.g., at the time that the user paused the game to visit the homepage. Or the current item tile 406 may present a stock image associated with the driving game "A," etc.

The output presentation 402 also includes representations of the z most recently presented items, selected from among a larger number of n items. These tiles are henceforth referred to as MRU item tiles 408. In this case, the output presentation 402 shows four MRU item tiles 408, but z can correspond to any configurable number.

In the example, the most recent previous item that was presented is a search application, associated with the MRU item tile 410. The next most recent previous item is a movie player application. The next most recent previous item is another game, i.e., game "B." The next most recent item is a social networking application, e.g., social networking application "F." The next most recent item, at position z+1, is currently concealed from the output presentation 402. Although not shown, the output presentation 402 may also optionally include a "show me more" option to expose additional items in the list of n most recently used items.

Each MRU item tile includes a presentation mode indicator that conveys the presentation mode that was last used to present the corresponding item. For example, the MRU item tile 410 includes an indicator 412, corresponding to the symbol "S." That indicator 412 conveys that the search application (associated with the MRU item tile 410) was last presented in a snap mode. More generally, each indicator can take any form and can be presented in any medium or combination of media. For example, in another case, the indicator 412 may correspond to an icon that appears above the MRU item tile 410. In another case, the indicator may correspond to some visual attribute of the MRU item tile 410 itself, such as the color, size, transparency level, etc. of the MRU item tile 410.

Further note that FIG. 4A indicates that each of the four MRU item tiles 408 is annotated with an indicator. But in another case, only a subset of the z most recently presented items may be annotated with indicators. The lack of an express indicator for an item may mean that the item was last presented in a particular default presentation mode (such as the full mode). Here, the lack of an indicator itself serves as an indicator. Or the lack of an indicator for an item may reflect an expectation that users will implicitly understand, based on the nature of the item, the presentation mode that will apply to the item, without being expressly informed. Or the lack of an indicator may indicate that the presentation mode for an item was not recorded or is otherwise not available for any reason.

The output presentation 402 also includes a set of favorite item tiles 414. The favorite item tiles 414 represent items that the user has manually selected as favorites, thereby "pinning" these items to the user's homepage for convenient later access. Although not shown, the output presentation 402 can include any other user interface features, such as: a portal to a store from which the user may obtain additional items; a collection of recommended item tiles corresponding to items that are being recommended by a store or some other entity; a collection of frequently-used item tiles corresponding to items that are frequently used (although not necessarily recently used), and so on.

Finally, the output presentation includes a service selector 416. The service selector 416 represents a service that the user may activate to obtain information regarding items that are capable of being presented in a certain mode, such as the snap mode. Later figures and accompanying explanation clarify the role of the service selector 416 and the service which it invokes.

Assume now that the user wishes to resume the presentation provided by the current item, represented by the current item tile 406. The user may perform this operation in different ways. In one approach, the user may select the current item tile 406 and then select a context menu (to be described later). The user may then interact with the context menu to request that the current item resume in a full mode, e.g., as opposed to a snap mode. The computing device can also allow the user to make such a selection via any kind of shortcut gesture, e.g., without expressly activating a context menu. For example, the user can activate the game "A" by directly clicking on or otherwise activating the current item tile 406.

As a result of the user's selection, the computing device presents the output presentation 418. The output presentation 418 presents the output of game "A." More specifically, assume that the computing device suspended the course of game "A" when the user visited the homepage (corresponding to the output presentation 402). The game "A" may further store state information which describes the state of the game at the time of its suspension. When the user resumes play, the game "A" may access the state information and use it to resume the course of the game, starting at the point at which it was suspended. Different applications may perform this task in different application-specific manners.

The computing device displays the output of game "A" in the full mode of presentation, as requested by the user. In the full mode, the computing device presents the output of an item in a primary display region. In a snap mode (not shown yet), the computing device presents the output of an item in a secondary display region. In general, the primary display region is more prominent compared to the secondary display region. Prominence may be reflected in the size of the primary region relative the secondary display region, and/or the position of the primary display region relative to the secondary display region, and/or some other attribute(s) of prominence.

More specifically, the terms primary and secondary are relative terms that assume different meanings for different presentation contexts. For example, when the user is single-tasking (e.g., by interacting with only a single item at one time), the primary display region associated with the full display mode may correspond to a substantial portion (or all) of the displayable space provided by a display device (as is the case for output presentation 418). When the user is multi-tasking (e.g., by interacting with two or more items at one time), the primary display region associated with the full mode may correspond to the largest portion of a split-screen presentation, or otherwise the most prominent portion (such as the central portion) of the split-screen presentation, etc. To facilitate explanation, when multi-tasking, the full presentation mode for an item may be referred to as a fill mode, insofar as the computing device may present the output of the item by filling up the largest display space that is currently available.

In contrast, when the user is multi-tasking, the secondary display region associated with the snap mode may correspond to the smallest display region associated with a split-screen presentation, or otherwise a less prominent portion of the split-screen presentation (compared to the primary display region). For example, the secondary display region may correspond to a smaller region that lies to the left or the right of the primary display region in a split-screen presentation. This presentation may also be referred to as a snapped display region insofar as it is metaphorically "snapped" to one side of the split-screen presentation. In terms of user experience, the user may naturally provide a greater focus of attention to the primary display region compared to the secondary display region.

The split-screen example represents only one implementation of the full/fill mode and the snap modes. In another case, for example, the computing device may present the secondary display region as a picture-in-picture region within the primary display region. In another case, the computing device may present the secondary display region as a pop-up display panel that a user may activate and deactivate at will. In another case, the computing device may allow the user to toggle between the primary and secondary display regions in any manner, without necessarily displaying them at the same time. In another case, the computing device may split the output screen into three or more part; here, the primary display region may correspond to the largest portion and/or the portion closest to the center of the screen. In this last-mentioned case, there are two or more secondary display portions, which may be ranked in prominence or treated as having equal prominence. Still other variations are possible.

Figure 4B:
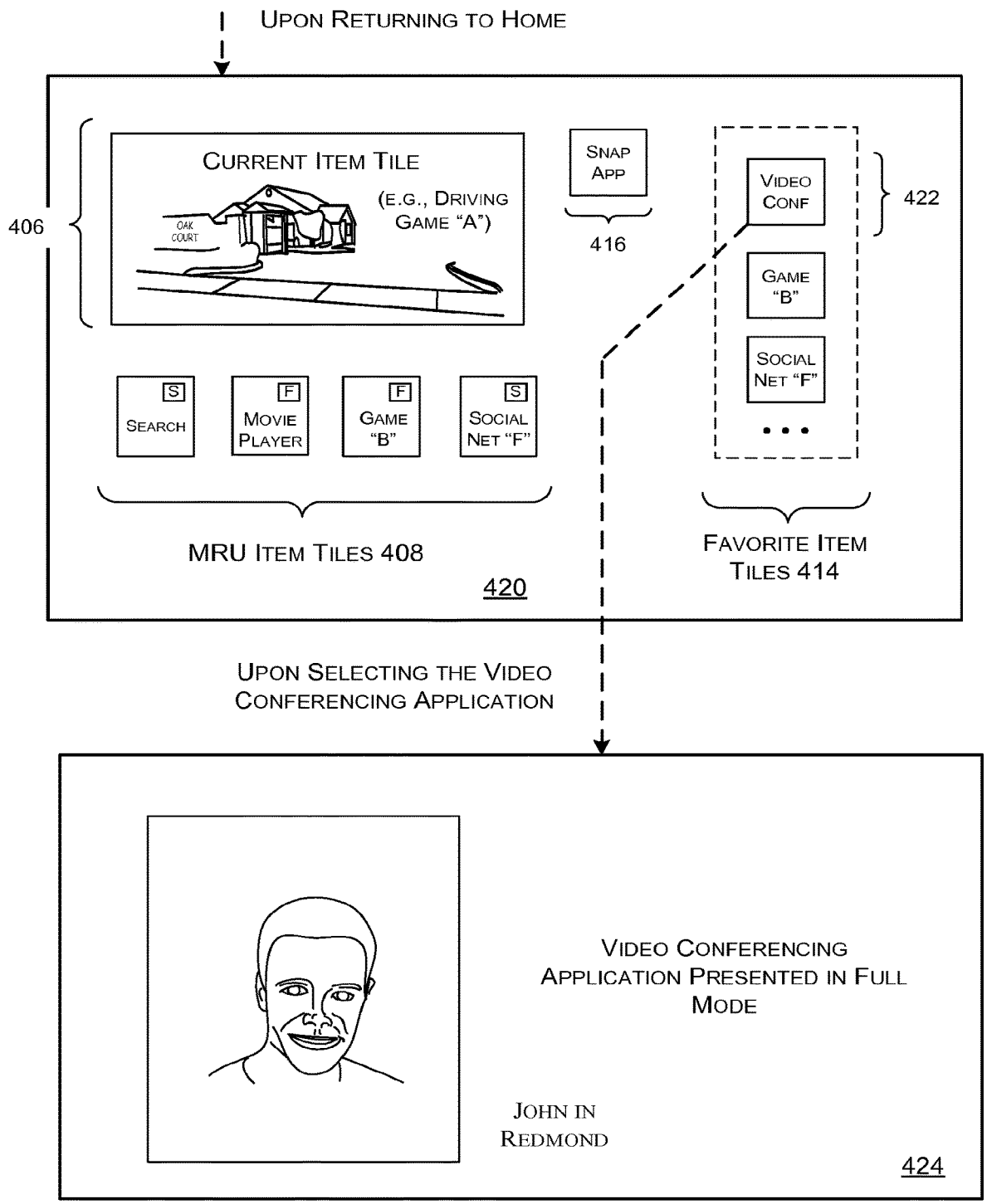

Advancing to FIG. 4B, assume now that the user again returns to the homepage, corresponding to the output presentation 420. Then assume that the user selects a new item, such as a video conferencing application associated with the favorite item tile 422. Once again, the user can activate this item in any manner. For example, assume that the user selects the favorite item tile 414 and then activates the context menu. Assume that the user then uses the context menu to instruct the computing device to present the video conferencing application in the full mode. Or the computing device may, as a default, present the video conferencing application in the full mode when the user directly clicks on its tile 422, if the full mode is available for this item.

As a result of any of the above operations, the computing device generates the output presentation 424. Assume that the user is still single-tasking. Hence, the computing device may display the output of the video conferencing application in the full mode by displaying it over the entire available display space. In one merely illustrative case, the output may show an image of a person ("John in Redmond") with whom the user is communicating.

Figure 4C:
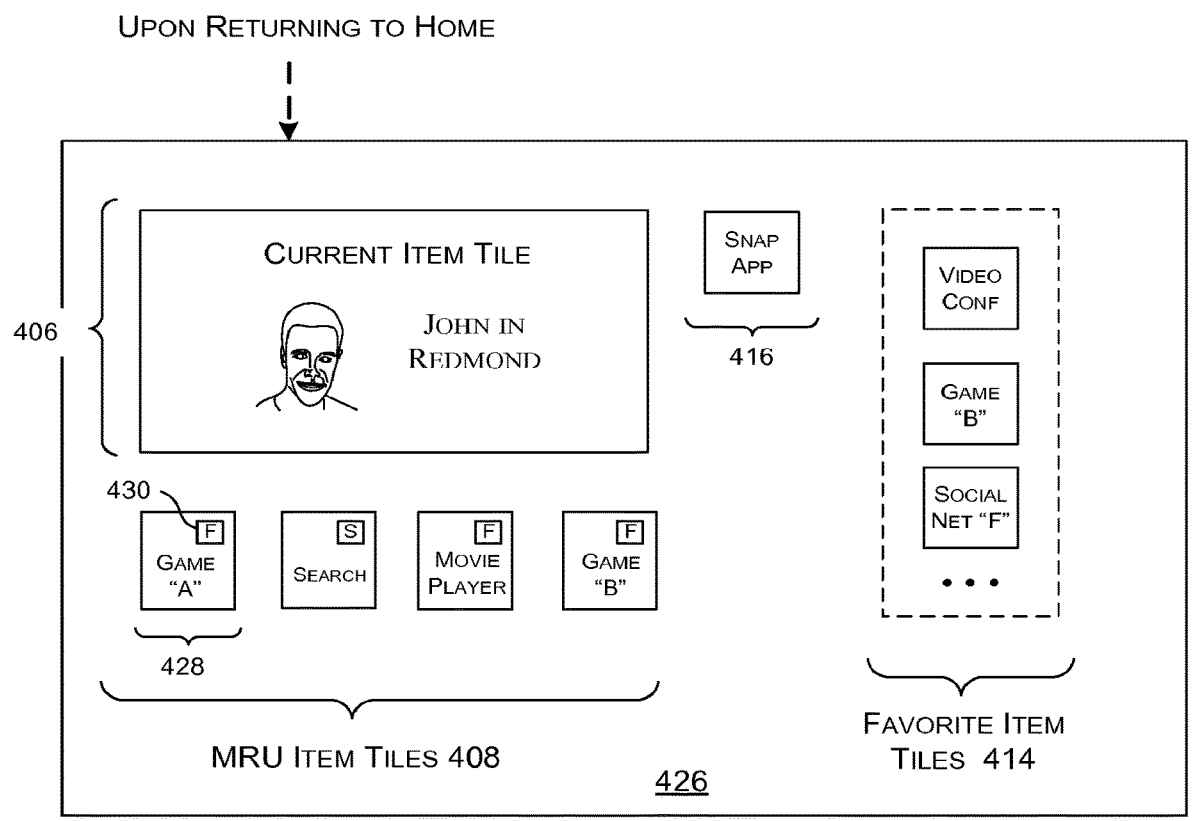

Advancing now to FIG. 4C, assume that the user again returns to the homepage, corresponding to the output presentation 426. At this juncture, the current item corresponds to the video conferencing application, so the current item tile 406 presents a representation of that item. The most recently presented item now corresponds to the game "A." Thus, the MRU item tile 428 represents the game "A" and the indicator 430 conveys to the user that he or she was consuming game "A" in the full mode, represented by the icon "F." Further note that the MRU item tile for the social networking application "F" has fallen off the list of z most recent items, and therefore does not appear in the output presentation 426 at this time.

Figure 4D:
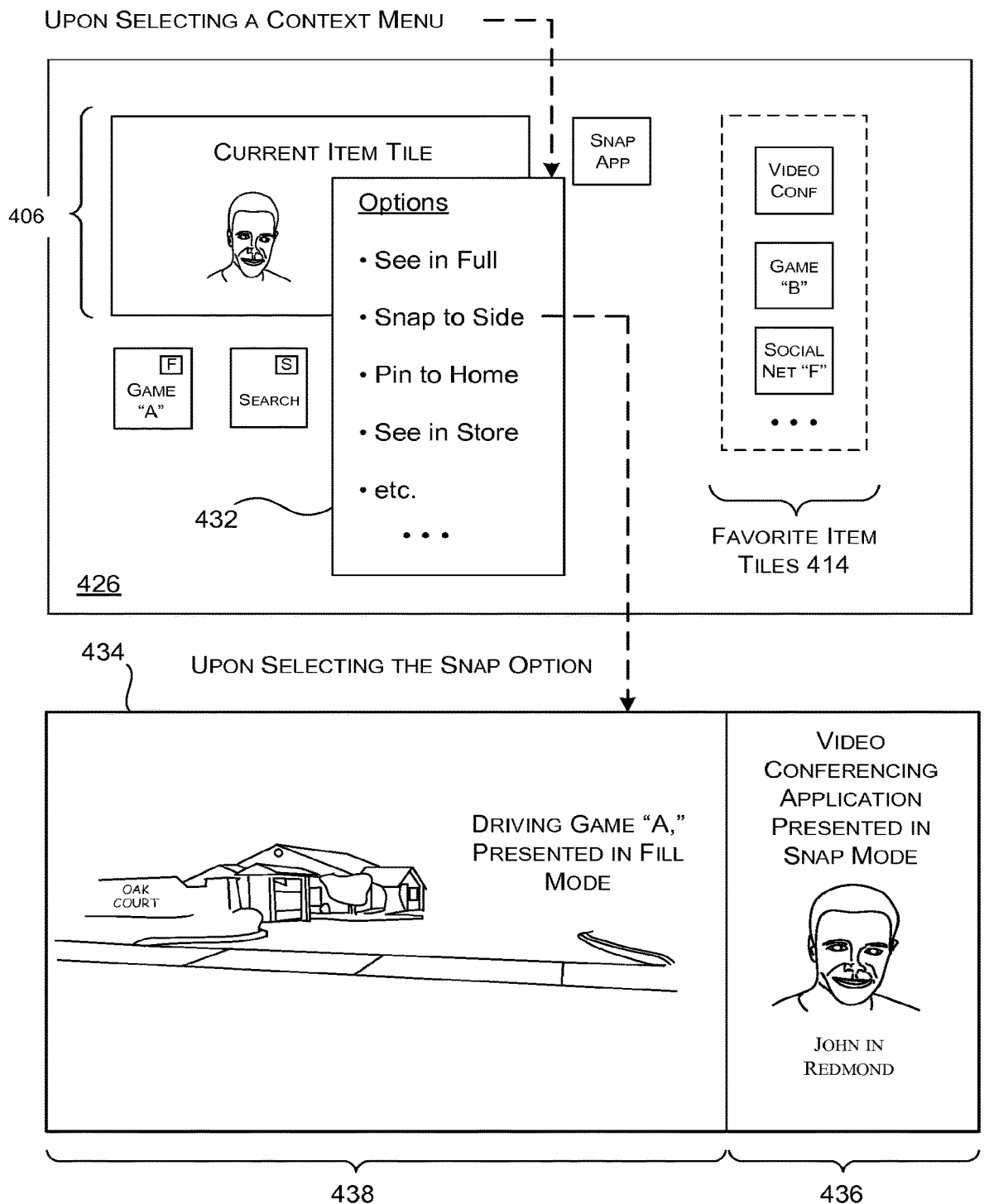

Advancing to FIG. 4D, assume that the user now wishes to resume the video conferencing application, but this time in the snap mode, not the full mode. To perform this task, the user may select the current item tile 406 and then activate the context menu 432. The context menu 432 may provide a list of options which are possible for this particular item (the video conferencing application), and may exclude options that are not possible for this particular item. Two respective options allow the user to present the item in a full mode or a snap mode. Assume that the user selects the snap mode.

As a result of the user's selection, the computing device presents the output presentation 434. The output presentation 434 displays the video conferencing application in a secondary display region 436 (also referred to as the snap display region), and it may resume the game "A" in a primary display region 438, because the game "A" is the most recently presented item in the list of z most recent items. As indicated, the secondary display region 436 is peripherally oriented within the overall output presentation 434, and it is smaller than the primary display region 438. But, to repeat, the prominence of the primary display region 438 relative to the secondary display region 436 can be established in other ways.

The computing device can resume the game "A" in different ways. In one case, the computing device stores the state of game "A" at the point in time at which it was suspended. The computing device can resume the game "A" from that point in time, based on the stored state information. In another mode, the computing device may restart game "A" from its beginning without reference to stored state information.

Advancing to FIG. 4E, assume that the user again returns to the homepage, associated with output presentation 440. The current item tile 406 now presents a visual indication that the user is currently consuming two items via a split-screen presentation, e.g., by joining two tiles (406A, 406B) together, the tile 406A corresponding the game "A" and the tile 406B corresponding to the video conferencing application.

Now assume that the user wishes to close the video conferencing application. Different implementations can allow the user to perform this task in different ways. In the non-limiting case of FIG. 4E, the output presentation 444 includes an un-snap command 442. The user may activate this command 442 to remove the snapped component of the output presentation, thereby closing down the video conferencing application. As another option, the user may select the tile 406A associated with game "A," and then instruct the computing device to present this item in the full mode.

As a result of the user's above-described actions, the computing device may update the homepage, to produce the output presentation 444. (Alternatively, although not shown in FIG. 4E, the computing device may directly advance to a presentation of game "A" in the full mode). In the output presentation 444, the current item tile 406 displays a representation of just the game "A." Further, the most recently presented item now corresponds to the video conferencing application, so the MRU item tile 446 now represents the video conferencing application. The indicator 448 for this MRU item tile 446 indicates that the video conferencing application was last presented in the snap mode, rather than the full mode.

Figure 4F:
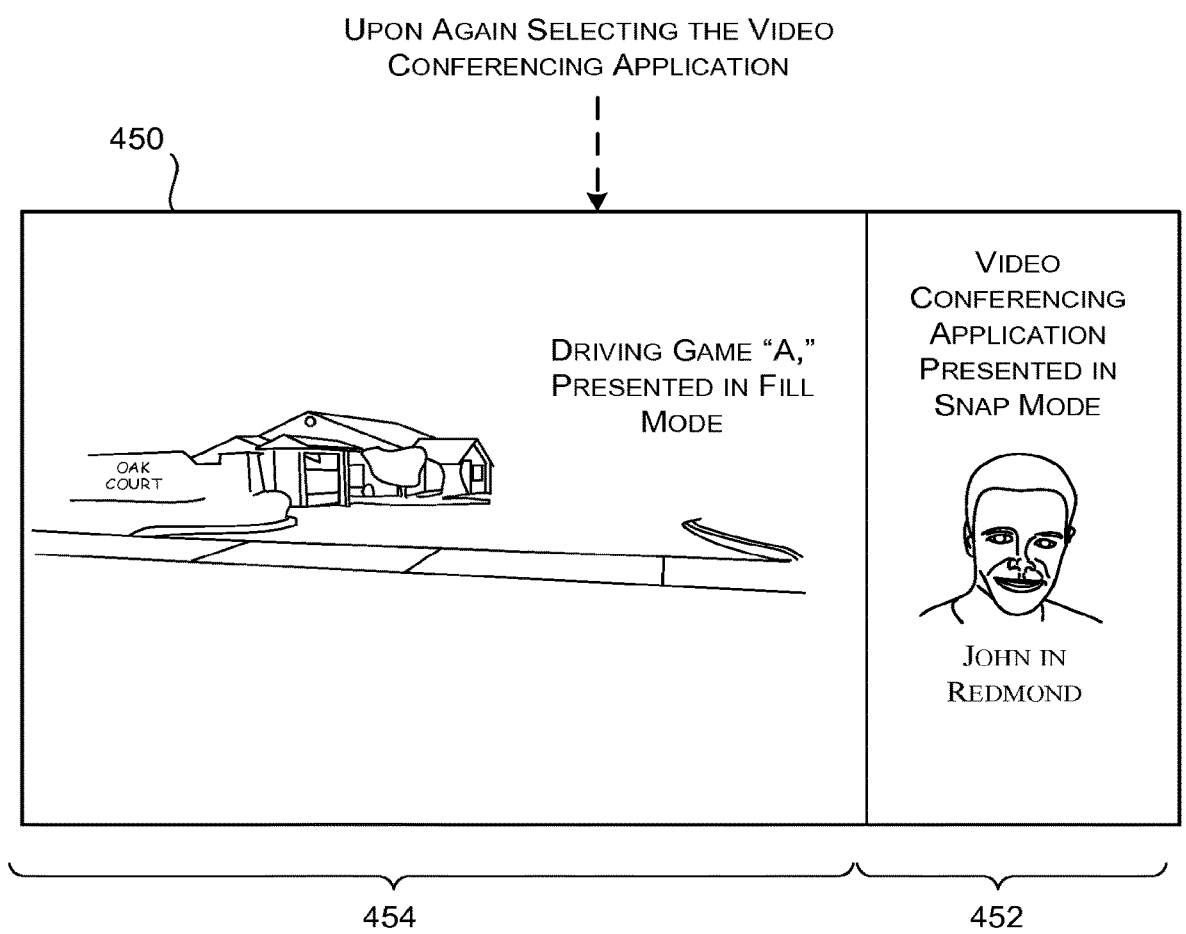

Finally, advancing to FIG. 4F, assume that the user wants to reactivate the video conferencing application. The user may perform this task by selecting the MRU item tile 446 for this application, e.g., by clicking on it. As a default, the user's action causes the computing device to present the output presentation 450 shown in FIG. 4F. As indicated there, the computing device displays the video conferencing application in the snap mode, e.g., in the secondary display region 452. The computing device displays the game "A" in the primary display region 454. The reason that the computing device displays the video conferencing application in the snap mode is because the MRU information indicates that this was the last mode that was used to present this item, as reflected by the indicator 448 of FIG. 4E.

Although not shown in FIG. 4E, the user could have alternatively reactivated the video conferencing application in the full mode by selecting the MRU item tile 446, activating a context menu, and then selecting the "full mode" option in the context menu.

Figure 5:
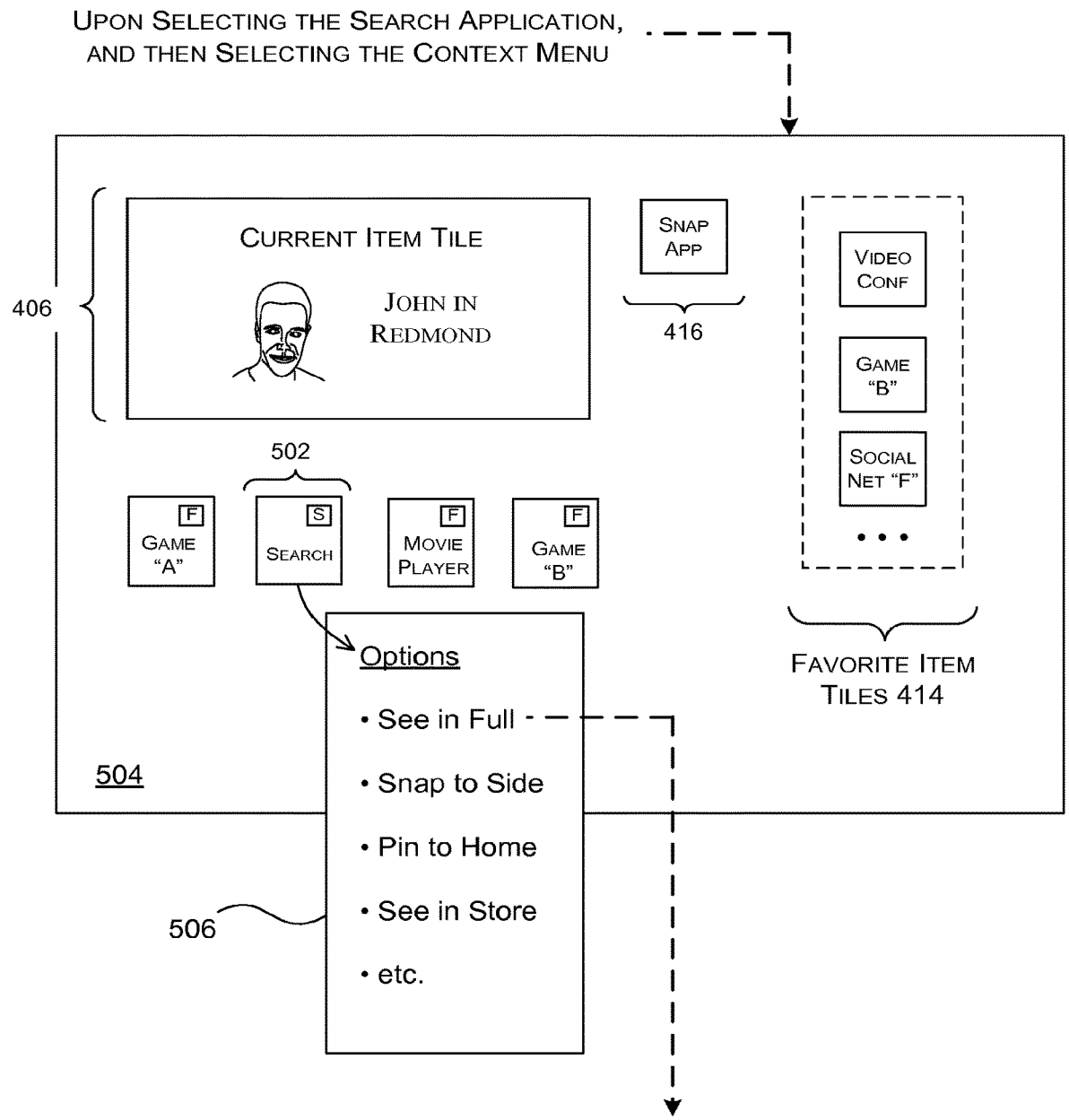

FIG. 5 shows the above-described alternative scenario. As indicated there, assume that the user selects an MRU item tile 502, associated with a search application, within an output presentation 504. The MRU item tile 502 includes an indicator "S" which conveys that the search application was last presented in the snap mode. If the user wants to alternatively display the output of the search application in the full mode, the user may activate a context menu 506 and then activate the "full mode" option in the list of options provided by the context menu 506.

Figure 6:
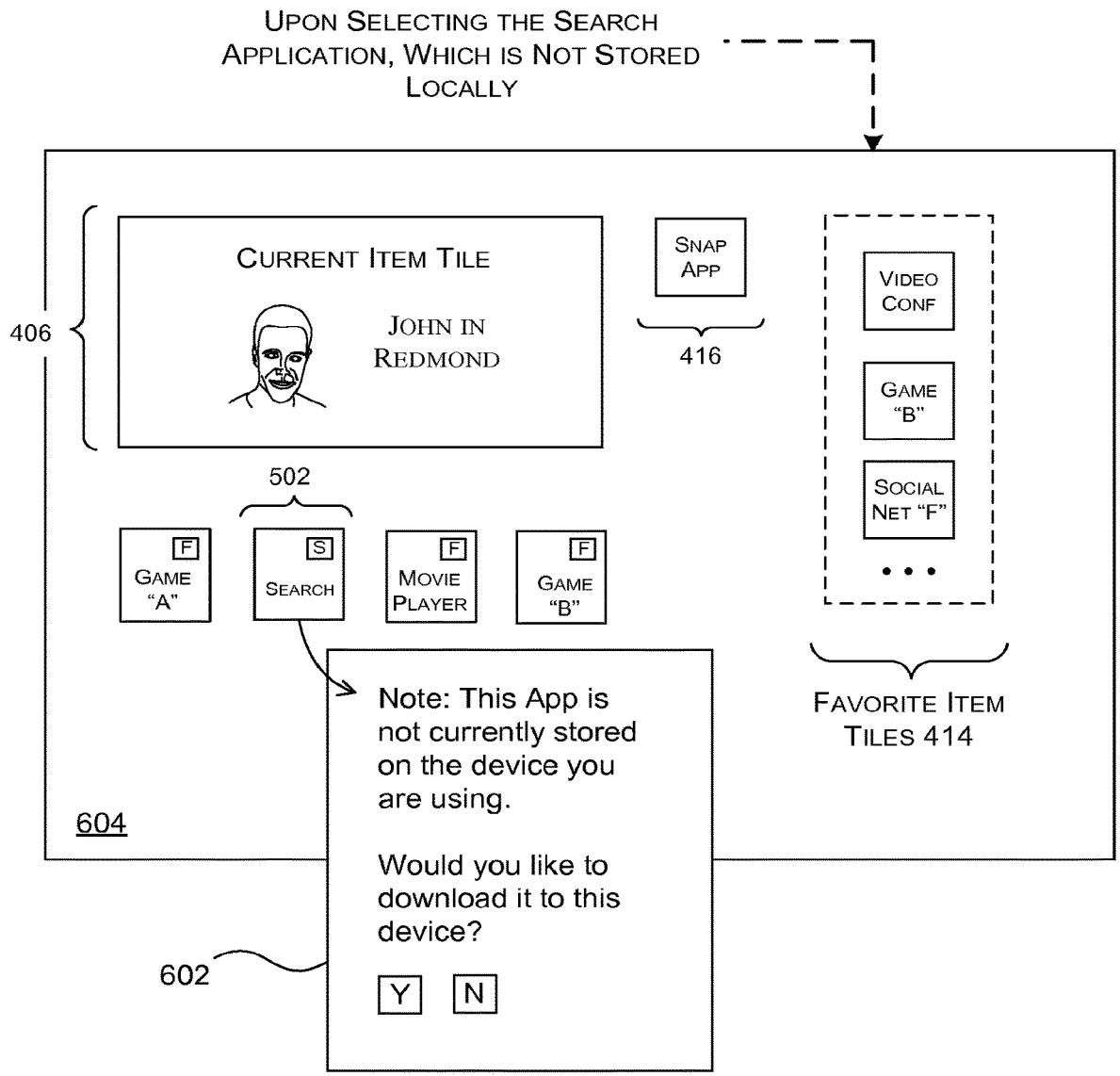
Figure 7:
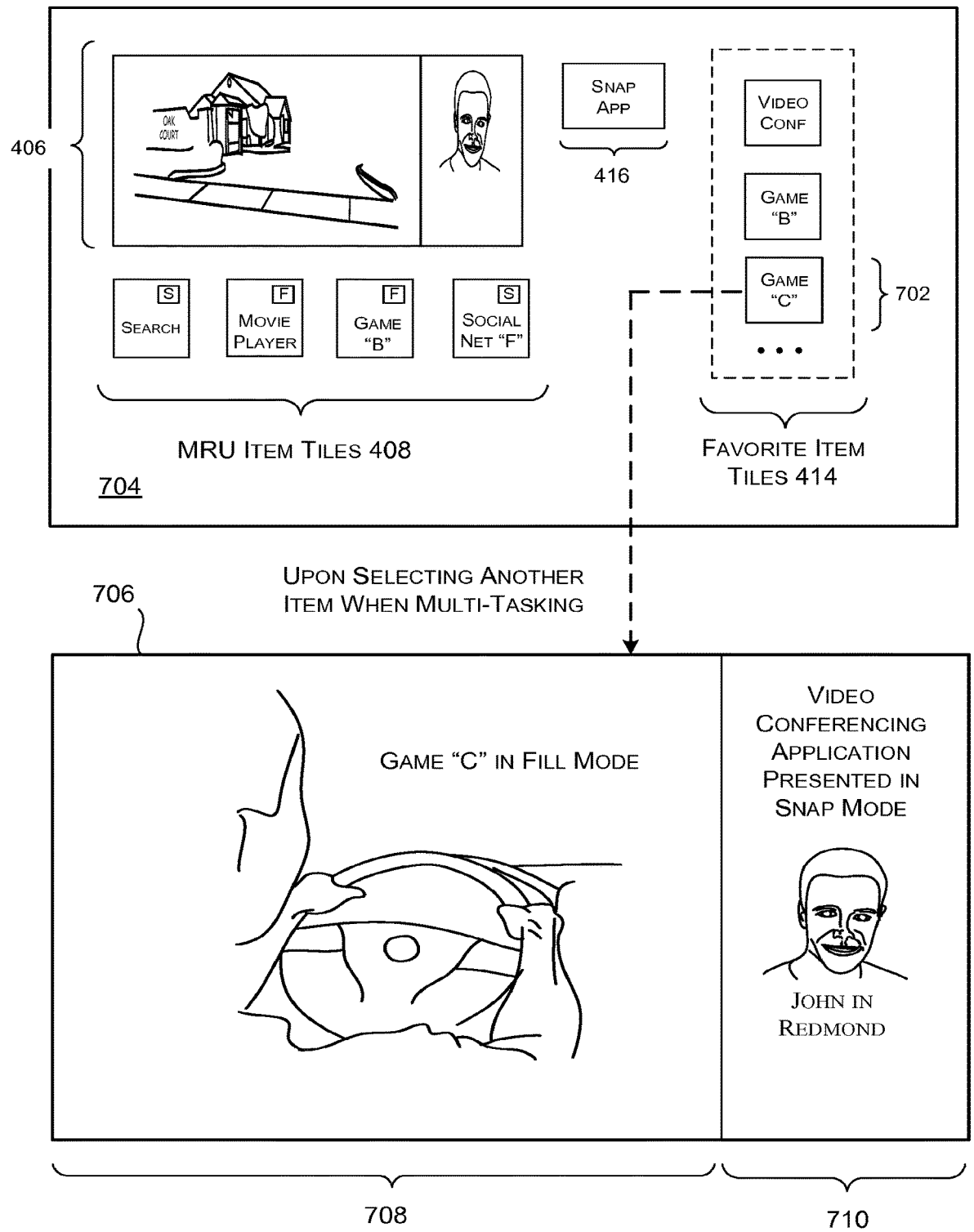
Figure 8:
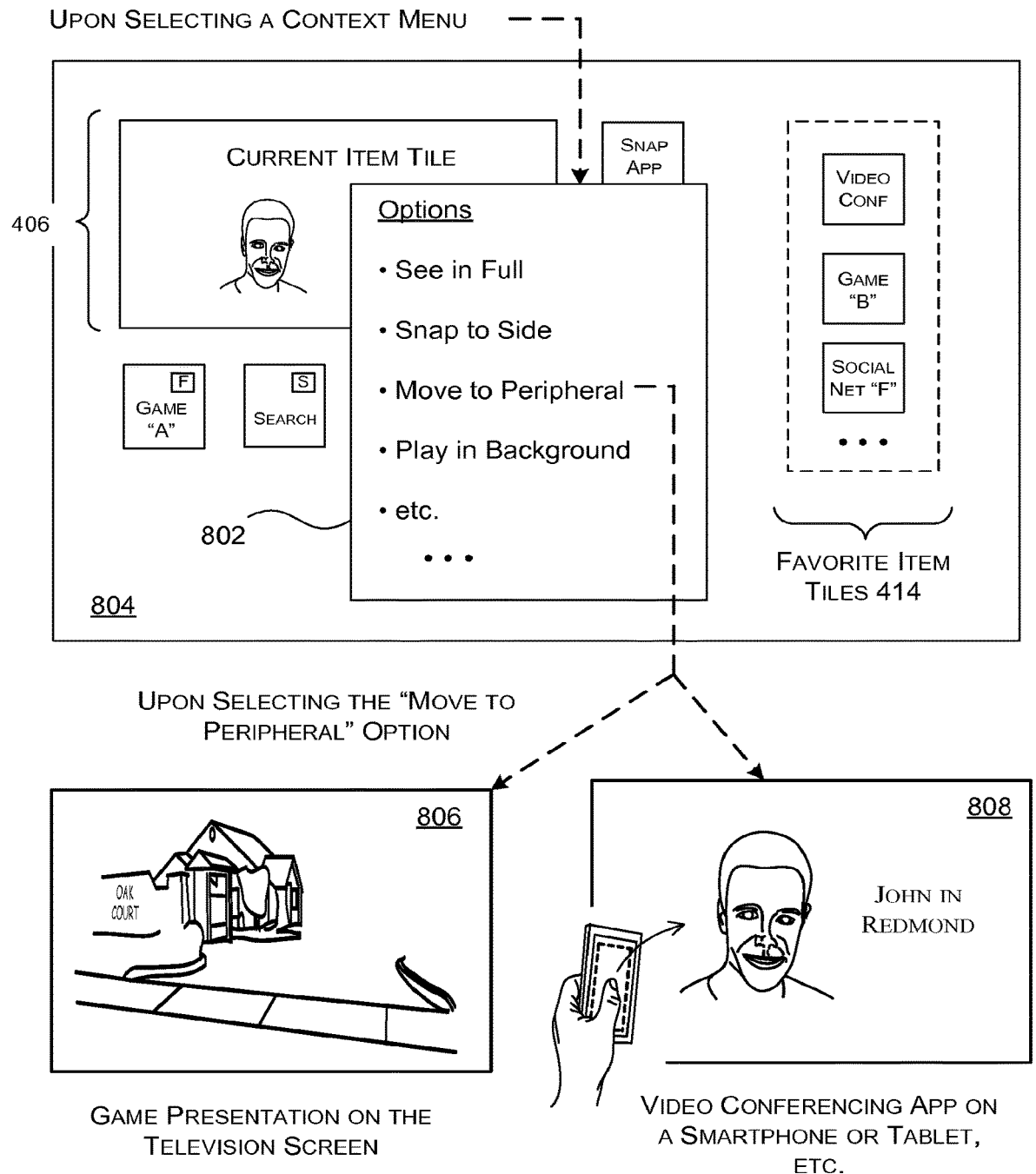

Advancing to FIG. 6, assume that the user again wants to select the search application, associated with the MRU item tile 502. But now assume that the search application is no longer stored on the local computing device with which the user is currently interacting. For example, the user may have first interacted with the search application when using a first computing device, but is now interacting with a separate second computing device, such as a computing device at the user's friend's house, or at the user's workplace. The second computing device can access the current list of the z most recently presented items from the remote data store, assuming that it has connectivity to that data store. But the second computing device may not, at this juncture, store the code associated with the search application itself. In another case, the user may have removed the search application from the first computing device.

To address this case, the computing device with which the user is currently interacting may display a notification 602 within an output presentation 604. The notification alerts the user to the fact that the requested item is not locally stored on his or her current computing device. The notification may also invite the user to obtain the item, e.g., by downloading it from a remote source, such as a data store provided by the remote computing framework 208.

In one case, the remote computing framework 208 can also store state information, which reflects the state of the search application at that time that the user closed it down. The current computing device (with which the user is currently interacting) can obtain both the state information and the code associated with the search application. This allows the user to resume the search application at the state at which he or she terminated the application, even though the user's current computing device did not originally preserve the state information. Otherwise, the state information may be lost and the user may resume the search application from its default starting point.

Advancing to FIG. 7, again assume that the current item tile 406 reveals that the user is currently consuming the game "A" in the fill mode and the video conferencing application in the snap mode. Assume that, at this juncture, the user activates a game "C," associated with a favorite item tile 702 in output presentation 704, e.g., by clicking on the tile 702. In response, the computing device can produce the output presentation 706. In that presentation 706, the computing device displays, as a default, the game "C" in fill mode in the primary display region 708 (if this option is available for the game "C") and the video conferencing application in the snap mode in the secondary display region 710. In other words, the computing device replaces game "A" with game "C," such that game "A" is now the most recently presented item in the list of z most recently presented items.

In the above description, the user was offered the choice between two presentation modes: the full (or fill) presentation mode and the snap presentation mode. But other implementations can offer additional presentation mode choices. For example, in FIG. 8 assume that the user again wishes to activate the video conferencing application in a particular presentation mode. To do so, the user may activate the context menu 802 within the output presentation 804. Here, the context menu 802 provides two additional presentation mode options: move to peripheral, and play in background.

First assume that the user selects the first additional option, "move to peripheral." Further assume that the computing device represents a game console that displays content on a primary display device, such as a television screen. In response to the user's selection of the "move to peripheral" option, the game console can display the output of the game "A" on the television screen 806 in the full mode. On the other hand, the game console can now display the output of the video conferencing application on an entirely different display device, such as the display device 808 provided by a stationary personal computing device, a tablet computing device, a smartphone, etc.

Figure 9:
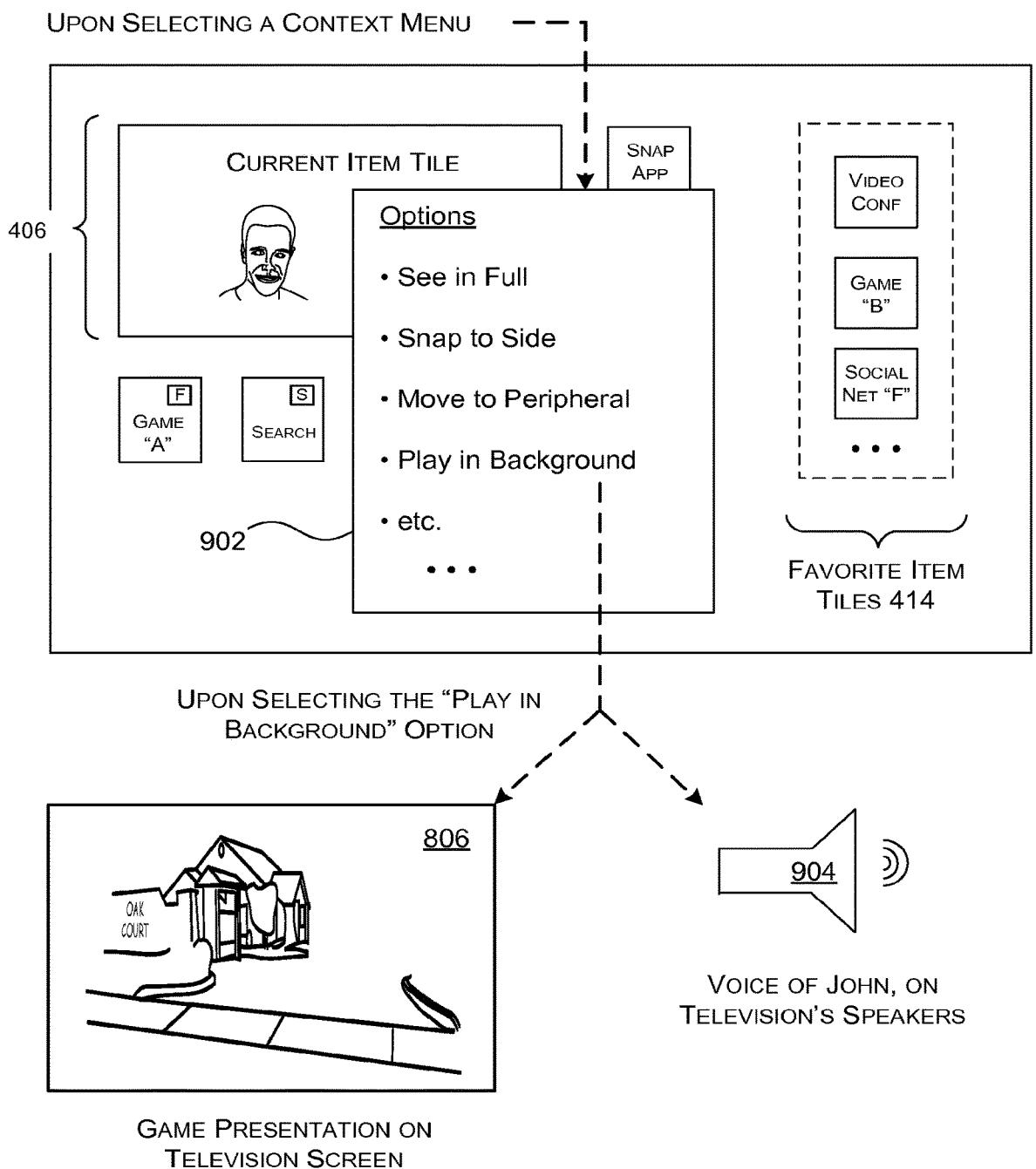

Advancing to FIG. 9, assume now that the user alternatively selects the "play in background" option of the context menu 902. In response, the game console can again continue to display the game "A" on the television screen 806 in the full mode. But now the game console displays just the audio component of the video conferencing application on the speakers 904 of the television set. In other words, the video conferencing application may be said to run in the background with respect to the user's interaction with game "A," insofar as it at least does not interfere with the screen space allocated to the game "A." In another implementation, the game console can optionally mute the audio output of the game "A," or reduce the volume of the game "A."

The transfer and background modes are cited by way of illustration, not limitation. Still further presentation modes are possible, as identified in Subsection A.1. Further, the computing device can allow the user to select from among different varieties of split-screen presentations, such as the above-described two-way split-screen presentation, or a three-way presentation, etc.

Although not shown, a homepage can further include indicators which represent the additional presentation modes described above, such as by displaying an "M" symbol for the move-to-peripheral option, a "B" symbol for the play-in-background option, and an "S3" symbol for the three-way split-screen presentation, and so on. The computing device can further allow a user to select two or more output presentations to be used in conjunction. For example, the user can instruct the computing device to display the video conferencing application on a separate device, and further indicate that the video conferencing application is to be presented in the background with respect to whatever other functions the separate device may be performing. The MRU item tile for this compound presentation mode may therefore include both the symbols "M" (for the move-to-peripheral component) and "B" (for the play-in-background component).

Figure 10:
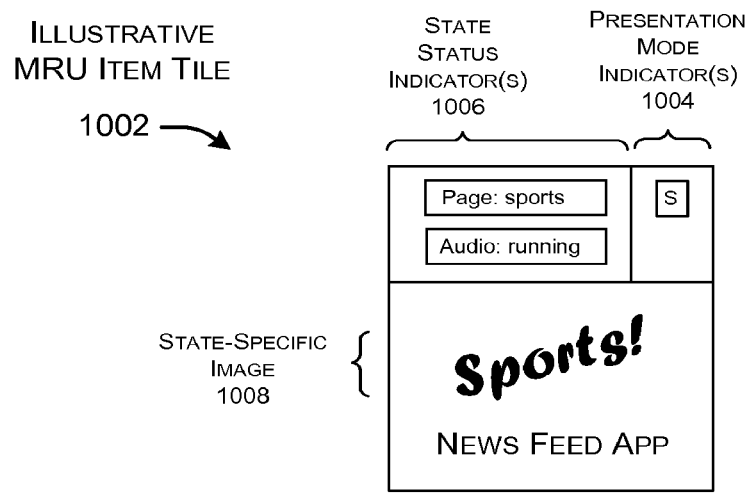
FIGS. 10 and 11 respectively show two most-recently-used (MRU) tiles for conveying information about items that have been recently viewed.

FIG. 10 shows an illustrative MRU item tile 1002 that corresponds to a news feed application, e.g., which presents a series of news stories to the user, as they become available. This MRU item tile 1002 is an example of a tile that includes plural indicators. As before, for instance, the MRU item tile 1002 may include one or more presentation mode indicators 1004. For example, the MRU item tile 1002 includes a presentation mode indicator that conveys the presentation mode in which the news feed application was last viewed—in this case the snap mode, associated with icon "S." That indicator also conveys the presentation mode in which the news feed application will resume, once reactivated.

The MRU item tile 1002 also includes one or more state status indicators 1006. Each state status indicator conveys an aspect of the current state of the news feed application itself. Each such state status indicator also conveys the state in which the application will resume, once reactivated. More specifically, a presentation mode indicator can be regarded as a system-wide property insofar as it describes the manner in which the computing system 102 will present the output of an application, while a state status indicator is an application-specific property because it describes a state associated with the application output flow itself.

The computing device presents the state status indicators based on stored state information. In one case, each individual application stores respective state information in the manner described above. The MRU management module 302 may also locally and/or remotely store certain aspects of the state information in the data store 120, along with the presentation mode information. For example, the MRU management module 302 may store high-level metadata pertaining to the state of each of the n most recently used items.

For example, assume that the news feed application hosts plural pages corresponding to different respective news themes. A first state status indicator indicates the page of the news feed application that was last viewed. In this example, the first state status indicator conveys that the user was last viewing the sports page. That state status indicator also conveys the page that will be presented when the user reactivates the news feed application.

A second state status indicator may indicate whether the audio content delivered by the news feed application is currently running (although not being presented to the user at this time), or whether it has been paused. In this example, the second state status indicator conveys that the audio is currently running. As such, when the user reactivates the news feed application, the audio will resume at its in-progress state.

The above two types of state status indicators were described by way of illustration, not limitation. The computing device can present indicators which reflect any other aspect of the state of an item. Further, the arrangement and individual appearances of the various indicators shown in FIG. 10 are presented by way of illustration, not limitation; other arrangements/appearances are possible.

The MRU item tile 1002 also can include a visual appearance that reflects the state of the corresponding item. For example, the MRU item tile 1002 can include a state-specific image 1008 which indicates that the user has last viewed the sports page of the application. In other cases, the state-specific image 1008 may correspond to an actual miniature snapshot (thumbnail) of the visual output of the application when it was last viewed.

Figure 11:
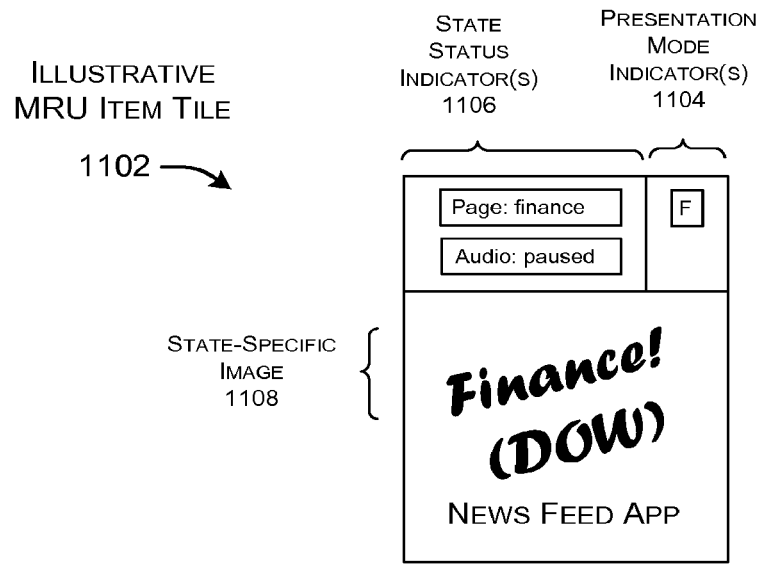

FIG. 11 shows another MRU item tile 1102 for the same news feed application, but where the application is now in a different state. That is, the presentation mode indicators 1104 indicate that the application was last viewed in the full mode. The state status indicators 1106 indicate that the user last viewed a DOW presentation provided by a finance page of the application, and that the audio presentation is currently paused (rather than ongoing). The state-specific image 1108 shows a finance-related image, and therefore the MRU item tile 1102 has a different overall appearance than the MRU item tile 1002, although these tiles pertain to the same application.

Figure 12A:
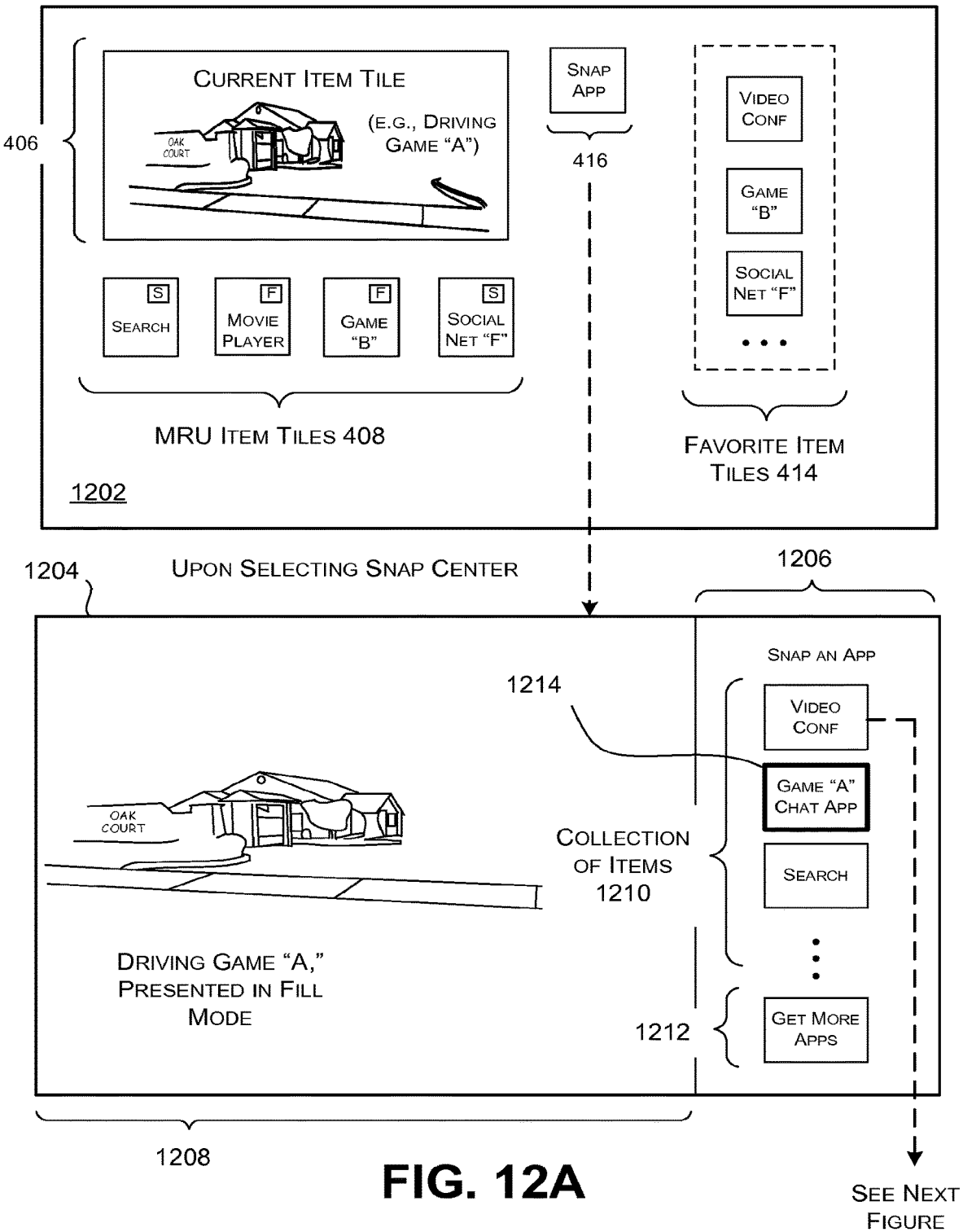
FIGS. 12A, 12B, and 13 show illustrative output presentations that can be provided by the computer system of FIG. 1, in connection with a snap service (associated, in turn, with a snap mode).
Figure 12B:
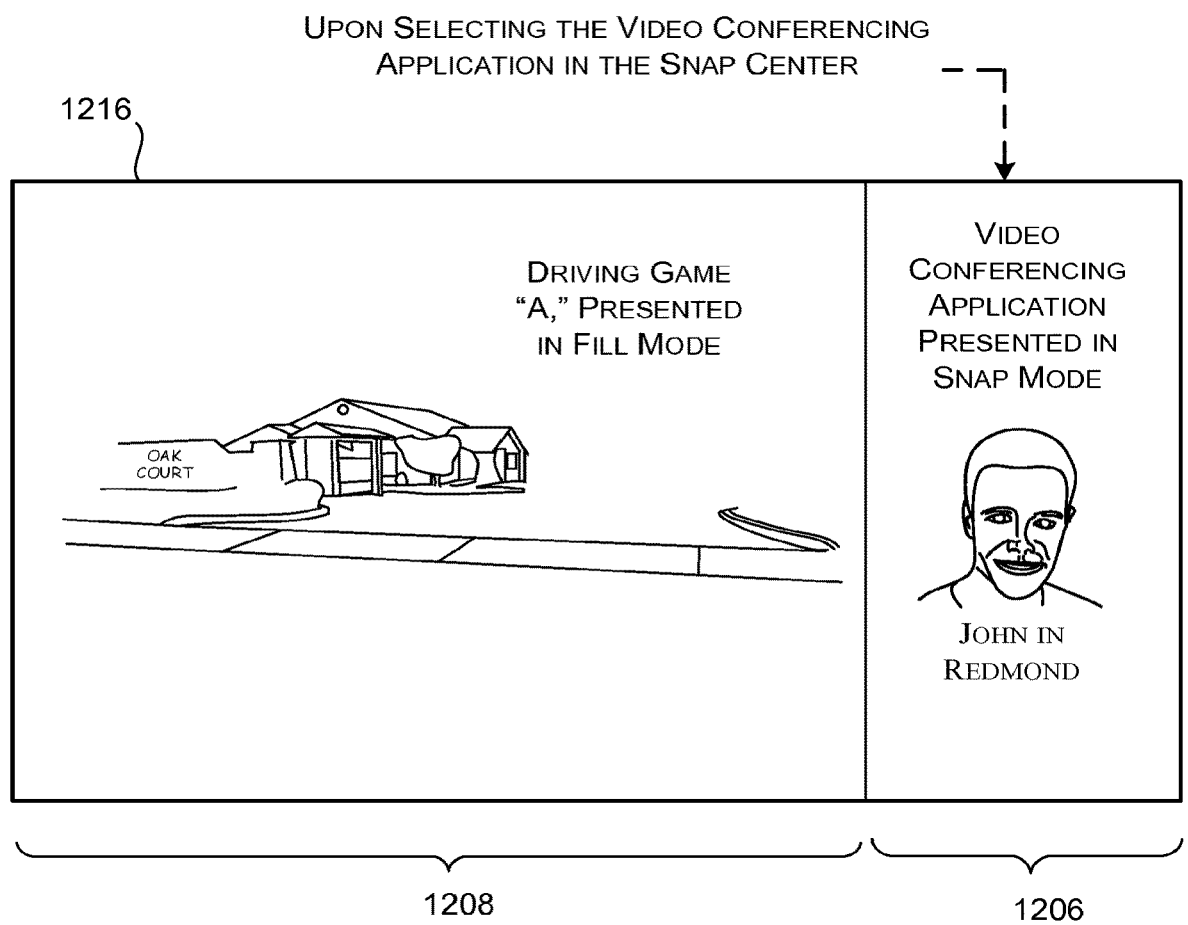

Advancing to FIG. 12A, this figure shows an output presentation 1002 in which the user activates the service selector 416. In response, the computing device presents the output presentation 1204. The output presentation 1204 displays an output associated with a snap service (provided, in turn, by the snap center interaction module 308) in the snap mode, within a secondary display region 1206. The computing device may present the game "A" (which the user was currently playing) in the fill mode within the primary display region 1208.

The secondary display region 1206 displays representations of a collection of items that can be selected in the snap mode, such as the video conferencing application, a game chat application (associated with the game "A"), the search application, and so on. The computing device may represent these applications with a collection of snap-capable item tiles 1210. In one implementation, the computing device may retrieve information regarding these items from the data store 310 of FIG. 3, which, in turn, may be produced by identifying the subset of items on the local computing device that are capable of being presented in the snap mode. The secondary display region 1206 also includes a "get more apps" tile 1212 which invites the user to obtain information regarding additional items that can be snapped. The computing device may obtain information regarding these additional items from the supplemental data store 312 of FIG. 3.

Note that the snap service, which provides the information in the secondary display region 1206, is itself an application that can be presented in the snap mode. Hence, the snap service behaves like any other application that is snapped, e.g., by displaying its output in the secondary display region 1206.

The snap center interaction module 308 can optionally order the items in the secondary display region 1206 based on any ordering criterion or criteria. For example, the snap center interaction module 308 can order the items based on the order in which they were most recently used by the user, e.g., such that the most recently used application appears at the top of the list. In addition, or alternatively, the snap center interaction module 308 can optionally omit any item from the secondary display region 1206 if it appears in a to-be-excluded list, even though such an application may be a snap-capable application. In addition, or alternatively, the snap center interaction module 308 can highlight one or more items based on any criterion or criteria. For example, the snap center interaction module 308 can present the tile 1214 in a highlighted mode because it pertains to an application which complements the application currently being presented in the fill mode, namely the game "A" application. In other words, the application associated with the tile 1214 is related to the game "A" application, and therefore it is reasonable that a user may want to interact with both at the same time.

Assume that the user now selects the video conferencing tile in the secondary display region 1206. In response, the computing device presents the output presentation 1216 shown in FIG. 12B. The output presentation 1216 continues to present the game "A" in the primary display region 1208, but now displays the video conferencing application in the secondary display region 1206.

Alternatively, assume that the user had selected the "get more apps" tile 1212 of FIG. 12A, and then subsequently selected one of the addition items presented in the secondary display region 1206 (not shown). In response, the computing device may retrieve the corresponding item from the remote computing framework 208 and store it on the user's local computing device. More concretely stated, the computing device may response to the user's instruction by downloading the code associated with a selected application.

Figure 13:
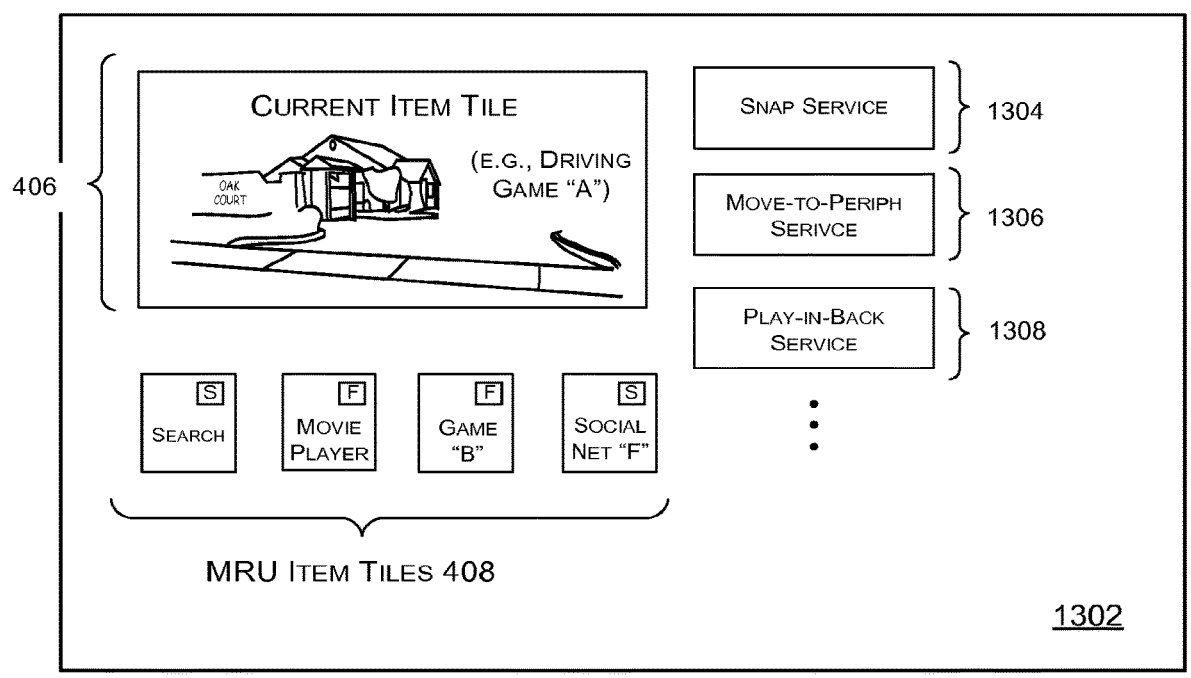

The above-described behavior was framed in the illustrative context of a particular service that allows a user to select from among items that can be presented in the snap mode. More generally stated, the computing device can invoke services that allow the user to select applications that can be presented in any output mode. For example, FIG. 13 shows an output presentation 1302 that allows a user to select a service selector 1304, to thereby invoke the above-described snap service. Alternatively, the user may select a service selector 1306 to invoke a move-to-peripheral service. The move-to-peripheral service presents a list of items that can be played on a separate device, in the manner shown in FIG. 8. Alternatively, the user may select a service selector 1308 to invoke a play-in-background service. The play-in-background service presents a list of items that can be presented in the background mode, in the manner shown in FIG. 9. Still other services and associated selectors are possible.

B. Illustrative Processes

FIGS. 14-19 show procedures that explain one manner of operation of the computer system 102 of Section A. Since the principles underlying the operation of the computer system 102 have already been described in Section A, certain operations will be addressed in summary fashion in this section.

Figure 14:
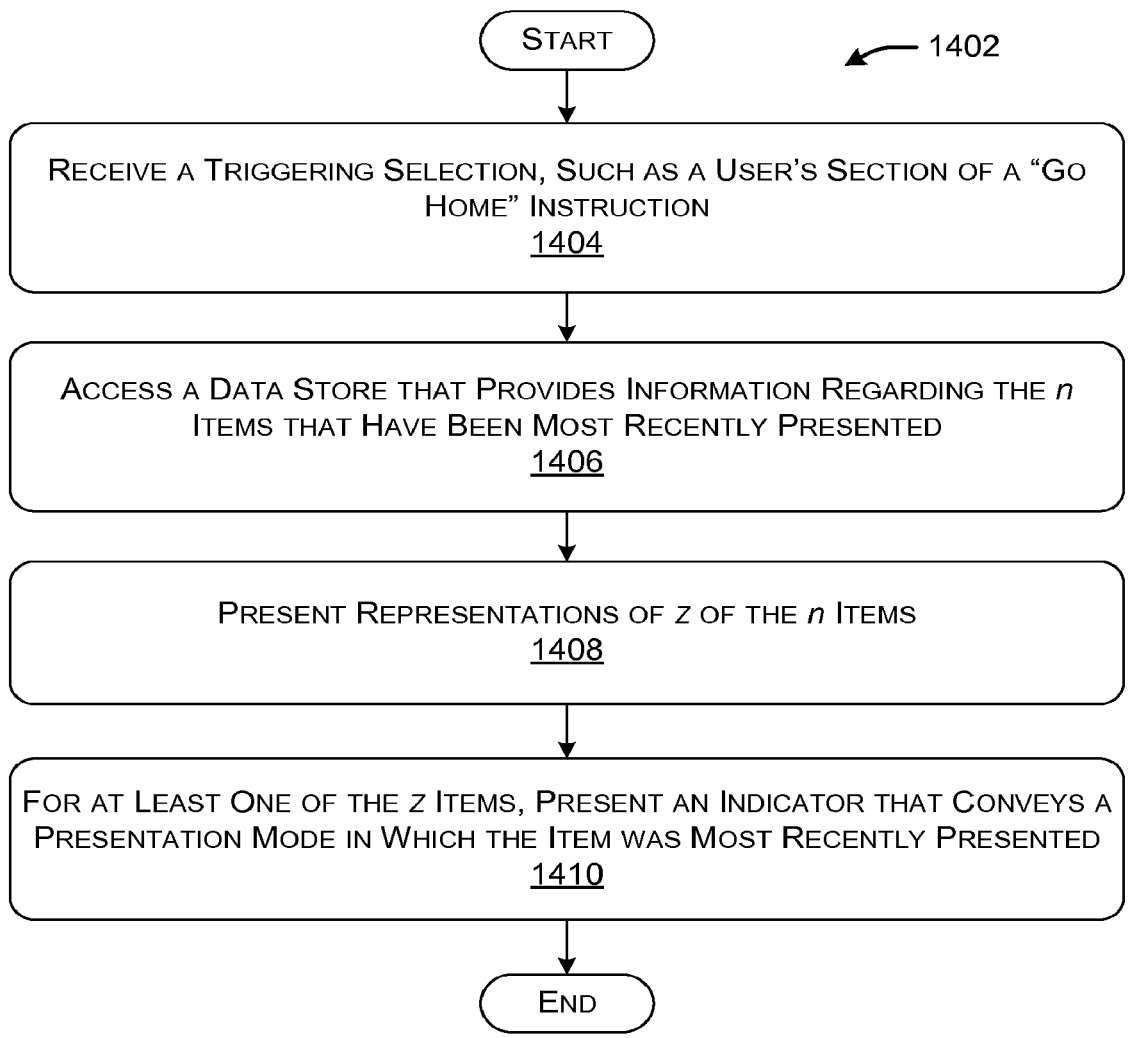
FIG. 14 shows a procedure which describes one way that the computer system (of FIG. 1) can present representations of the z mostly recently viewed items.

To begin with, FIG. 14 shows a procedure 1402 which describes one way that the computer system 102 can present representations of the z mostly recently viewed items. In block 1404, the computer system receives a triggering selection, such as the user's selection of a "go home" instruction, which instructs the computing device to go to a homepage presentation. In block 1406, the computer system 102 accesses a data store (e.g., data store 120) that provides MRU information, corresponding to information regarding the n items that have been most recently presented by the computer device for the user. In block 1408, the computer system 102 presents representations of the top z of the n items, such as the top four of the n item. In block 1410, the computer system 102 presents at least one presentation mode indicator for at least one item, conveying the presentation mode in which that item was last presented. Although not shown, the computer system 102 can optionally also present one or more state status indicators for each item.

Figure 15:
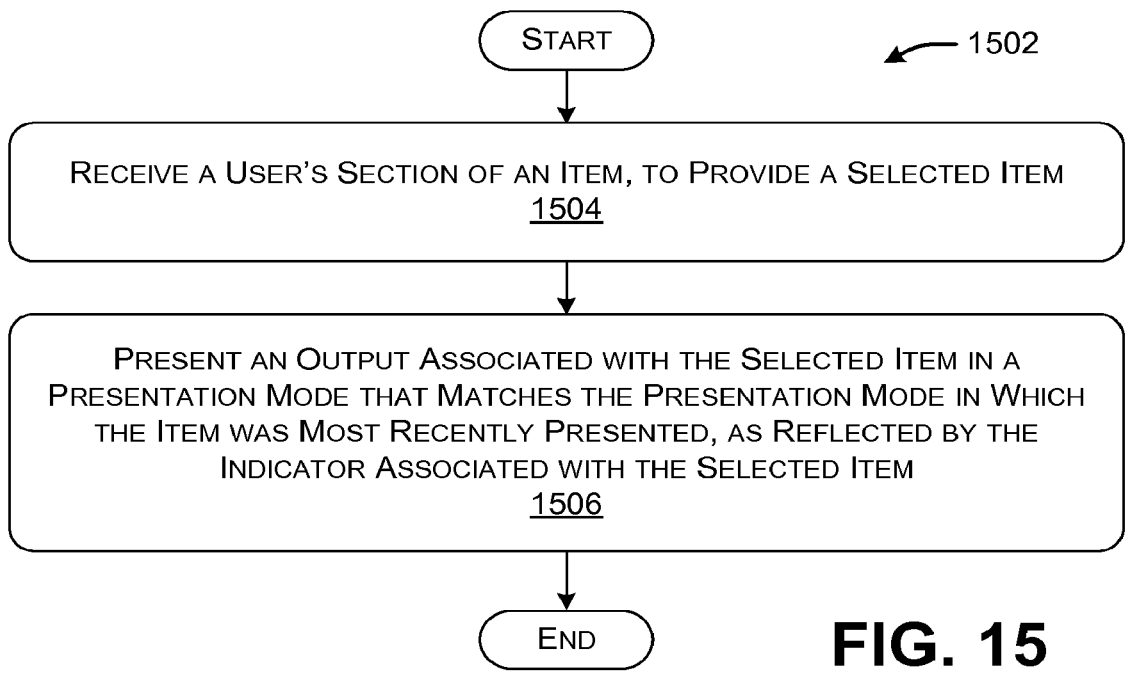
FIG. 15 shows a procedure which describes one way that the computer system can present the output of a selected item in a presentation mode that matches the most recently used presentation mode for the selected item.

FIG. 15 shows a procedure 1502 which describes one way that the computer system 102 can present the output of a selected item. In block 1504, the computer system 102 receives the user's selection of an item, to provide a selected item. For example, the user may select the MRU item tile associated with the selected item. In block 1506, the computer system 102 presents, as a default, an output associated with the selected item in a presentation mode that matches the presentation mode in which the selected item was most recently presented. This presentation mode is reflected by the indicator associated with the selected MRU item tile.

Figure 16:
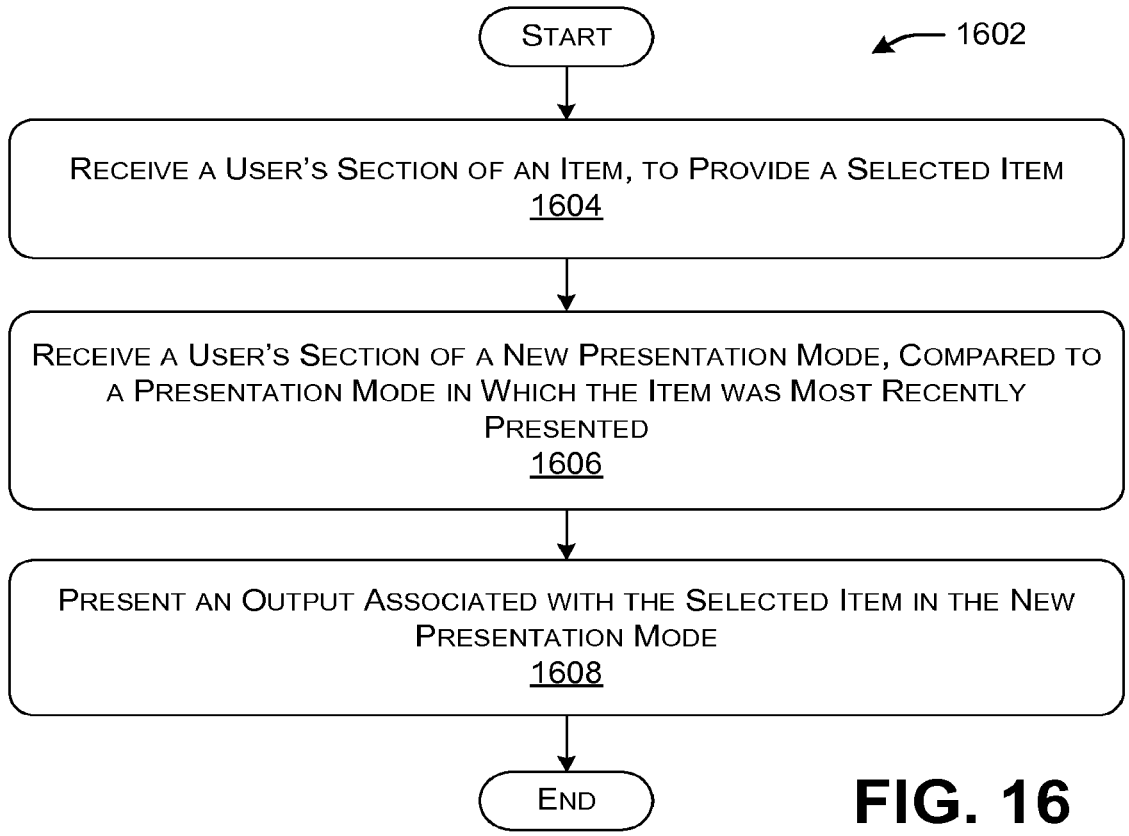
FIG. 16 shows a procedure which describes one way that the computer system can change the presentation mode for a selected item, e.g., so that it differs from the most recently used presentation mode.

FIG. 16 shows a procedure 1602 which describes one way that the computer system 102 can change the presentation mode for a selected item, e.g., so that it differs from the most recently used presentation mode. In block 1604, the computer system 102 receives the user's selection of an item, such as the user's selection of an MRU item tile associated with the item. This provides a selected item. In block 1606, the computer system 102 then receives the user's selection of a new presentation mode, which may differ from the presentation mode in which the item was last presented (as reflected by the indicator associated with the MRU item tile). In block 1608, the computer system 102 presents an output associated with the selected item using the new presentation mode.

Figure 17:
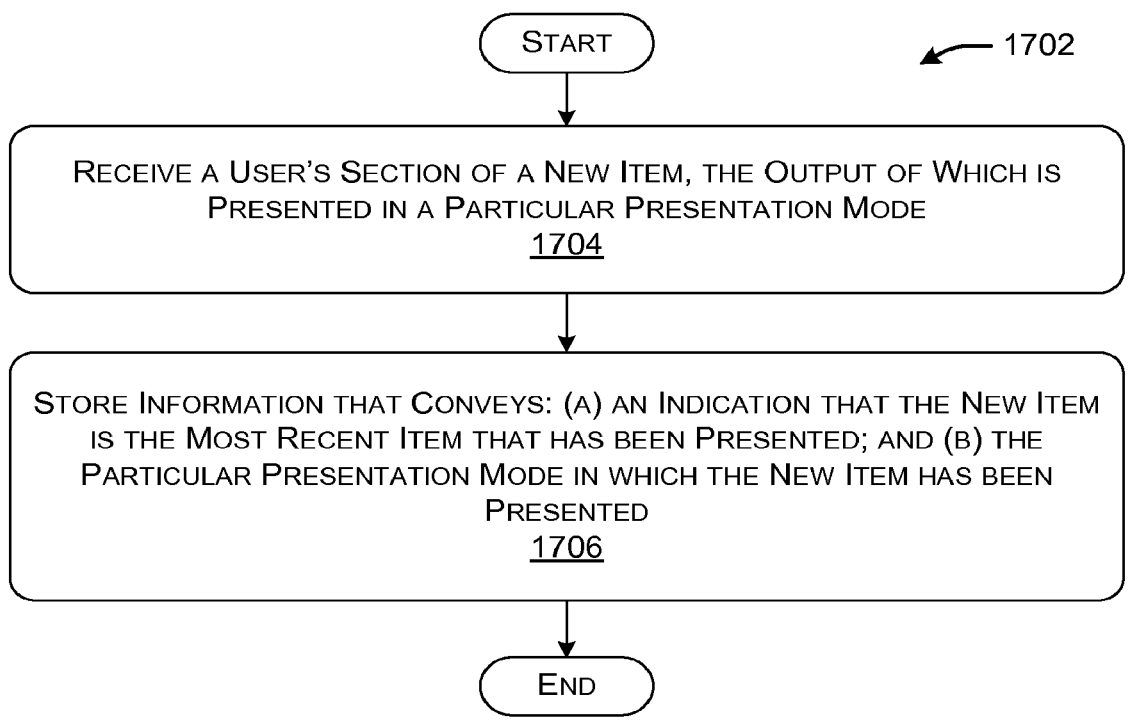
FIG. 17 shows a procedure which describes one way that the computer system can update stored information regarding the most recently used items, upon the selection of a new item.

FIG. 17 shows a procedure 1702 which describes one way that the computer system 102 can update stored information regarding the most recently used items, upon the selection of a new item. In block 1704, the computer system receives the user's selection of a new item, such as the user's selection of an item from the collection of favorite items. Further assume that the user opts to display this new item in a particular presentation mode, such as the full or snap modes. In block 1706, the computer system 102 stores information that conveys: (a) an indication that the new item is now the most recent item that has been selected; and (b) the particular presentation mode that was used to present the new item.

Figure 18:
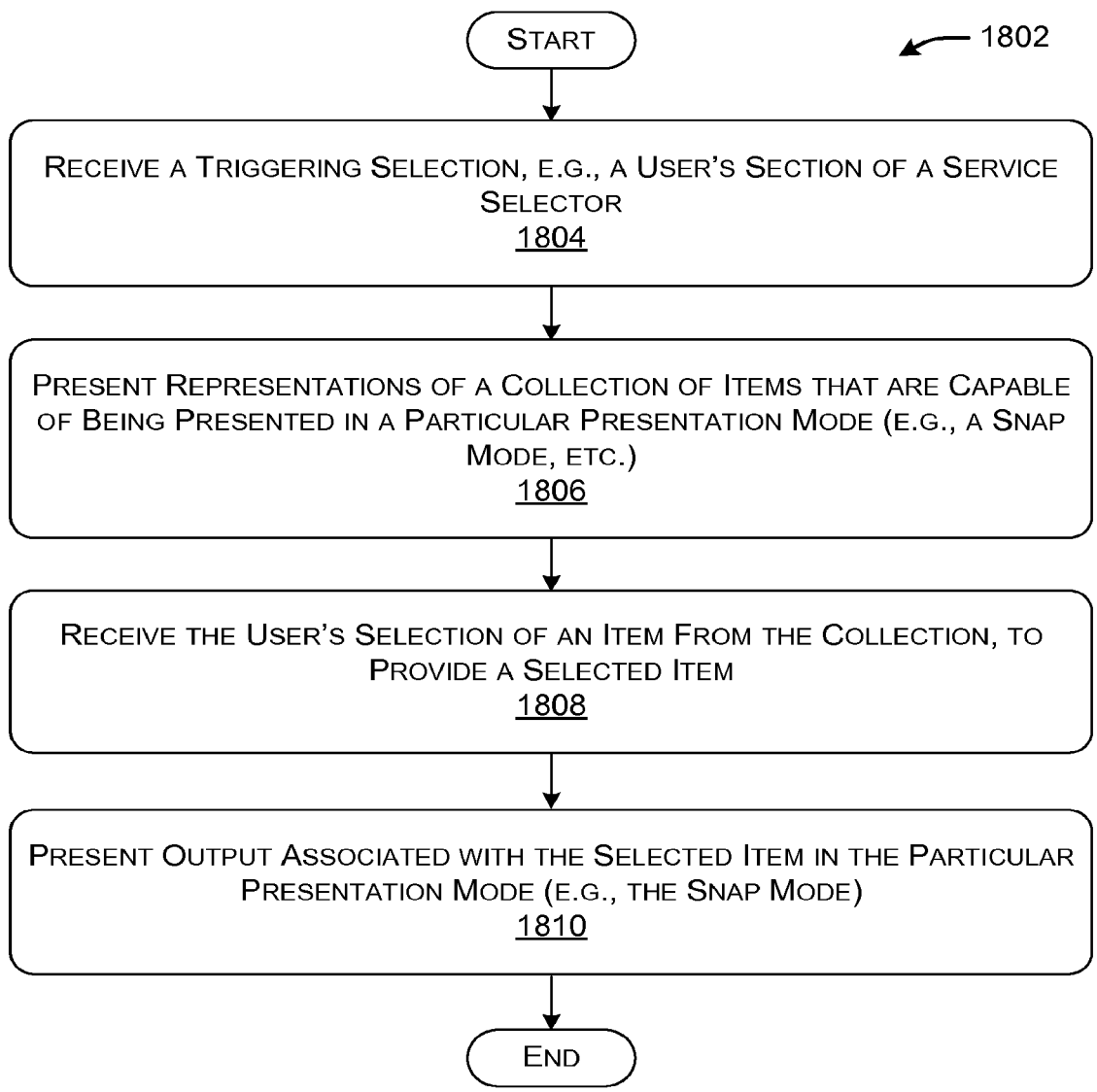
FIG. 18 shows a procedure which describes one way that the computer system can invoke and utilize the snap service associated with the snap mode (or a service dedicated to some other presentation mode).

FIG. 18 shows a procedure 1802 which describes one way that the computer system 102 can invoke and utilize a snap service (or a service dedicated to some other presentation mode). In block 1804, the computer system 102 receives a triggering selection, such as the user's selection of a service selector. In block 1806, in response to the selection of the service selector, the computer system 102 presents representations of a collection of items that are capable of being presented in a particular presentation mode (such as the snap presentation mode). The computer system 102 may specifically display the collection of items in a mode that matches the particular presentation mode, such as by presenting the items in a secondary display region, as per the snap presentation mode. In block 1808, the computer system 102 receives the user's selection of an item from the collection of items, to provide a selected item. In block 1810, the computer system 102 displays the selected item in the particular presentation mode (e.g., the snap presentation mode).

Figure 19:
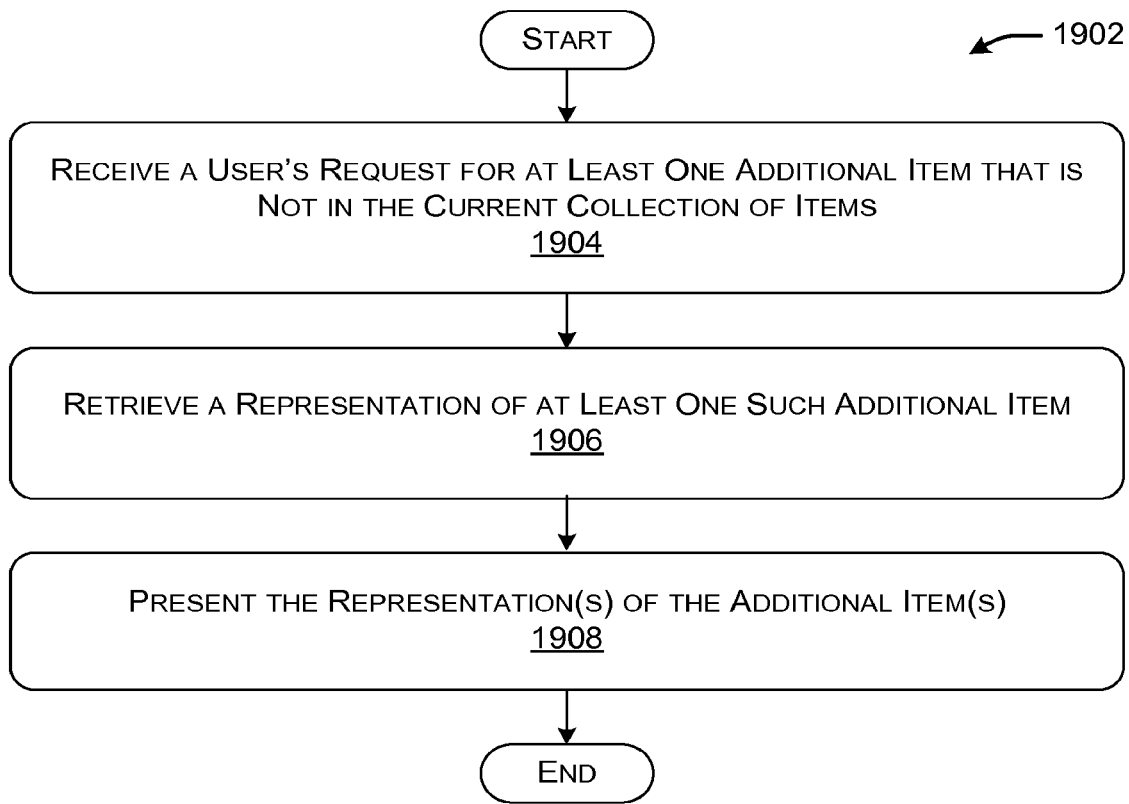
FIG. 19 shows a procedure which describes one way that the computer system can receive information regarding additional snap applications via the snap service.

Finally, FIG. 19 shows a procedure 1902 which describes one way that the computer system 102 can receive information regarding additional items, in the context of interacting with the output of a particular service, such as the snap service. In block 1904, the computer system 102 receives a user's request for at least one additional item that is not currently in the collection of items. In block 1906, the computer system receives a representation of at least one such additional item. In block 1908, the computer system 102 displays the representations of the additional item(s).

C. Representative Computing Functionality

FIG. 20 shows computing functionality 2002 that can be used to implement any aspect of the computer system 102 of FIG. 1. For instance, the type of computing functionality 2002 shown in FIG. 20 can be used to implement any aspect of the local computing device 202 of FIG. 2, and the remote computing framework 208 of the same figure. In all cases, the computing functionality 2002 represents one or more physical and tangible processing mechanisms.

The computing functionality 2002 can include one or more processing devices 2004, such as one or more central processing units (CPUs), and/or one or more graphical processing units (GPUs), and so on.

The computing functionality 2002 can also include any storage resources 2006 for storing any kind of information, such as code, settings, data, etc. Without limitation, for instance, the storage resources 2006 may include any of: RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removal component of the computing functionality 2002. The computing functionality 2002 may perform any of the functions described above when the processing devices 2004 carry out instructions stored in any storage resource or combination of storage resources.

As to terminology, any of the storage resources 2006, or any combination of the storage resources 2006, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 2002 also includes one or more drive mechanisms 2008 for interacting with any storage resource, such as a hard disk drive mechanism, an optical disk drive mechanism, and so on.

The computing functionality 2002 also includes an input/output module 2010 for receiving various inputs (via input devices 2012), and for providing various outputs (via output devices 2014). Illustrative types of input devices were identified above in Subsection A.1. One particular output mechanism may include a presentation device 2016 (such as a television screen) and an associated graphical user interface (GUI) 2018. Other types of output devices were identified in Subsection A.1. The computing functionality 2002 can also include one or more network interfaces 2020 for exchanging data with other devices via a computer network 2022. One or more communication buses 2024 communicatively couple the above-described components together.

The communication network 2022 can be implemented in any manner, e.g., by a local area network, a wide area network (e.g., the Internet), point-to-point connections, etc., or any combination thereof. The communication network 2022 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 2002 can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the functionality described above can employ various mechanisms to ensure the privacy of user data maintained by the functionality, in accordance with user expectations and applicable laws of relevant jurisdictions. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have described various concepts in the context of illustrative challenges or problems. This manner of explanation does not constitute a representation that others have appreciated and/or articulated the challenges or problems in the manner specified herein. Further, the claimed subject matter is not limited to implementations that solve any or all of the noted challenges/problems.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
   one or more processing devices; and
   one or more computer readable storage media storing computer readable instructions which, when executed by the one or more processing devices, cause the one or more processing devices to:
   provide a split-screen presentation having a primary display region designated for displaying items in a first presentation mode and a secondary display region designated for displaying items in a second presentation mode, the primary display region being relatively more prominent than the secondary display region;
   display a first item in the primary display region in the first presentation mode concurrently with a second item in the secondary display region in the second presentation mode;
   identify a third item that is capable of being presented in the first presentation mode;
   present a visual representation of the third item while the first item is shown in the primary display region and the second item is shown in the secondary display region, the visual representation being presented separately from the primary display region and the secondary display region;
   receive a user selection of the visual representation of the third item while the first item is shown in the primary display region and the second item is shown in the secondary display region; and
   responsive to the user selection of the visual representation of the third item, replace the first item in the primary display region of the split-screen presentation with the third item and retain the second item in the secondary display region of the split-screen presentation.

2. The system of claim 1, wherein the computer readable instructions, when executed by the one or more processing devices, cause the one or more processing devices to:
   present the visual representation of the third item with a presentation mode indicator that conveys that the third item will be presented in the primary display region upon selection of the visual representation.

3. The system of claim 1, wherein the primary display region is designated as occupying a leftward portion of the split-screen presentation and the secondary display region is designating as occupying a rightward portion of the split-screen presentation, the rightward portion occupying a relatively smaller display area than the leftward portion.

4. The system of claim 1, wherein the computer readable instructions, when executed by the one or more processing devices, cause the one or more processing devices to:
determine that the third item was previously presented in the primary display region; and
based at least on the third item having been previously presented in the primary display region, determine that the third item will be presented in the primary display region upon receiving the user selection of the visual representation of the third item.

5. The system of claim 1, wherein the computer readable instructions, when executed by the one or more processing devices, cause the one or more processing devices to:
determine that the third item was most recently presented in the primary display region; and
based at least on the third item having been most recently presented in the primary display region, determine that the third item will be presented in the primary display region upon receiving the user selection of the visual representation of the third item.

6. The system of claim 1, wherein the computer readable instructions, when executed by the one or more processing devices, cause the one or more processing devices to:
display the visual representation of the third item entirely outside of the split-screen presentation and concurrently with the split-screen presentation.

7. The system of claim 6, the third item comprising an application.

8. The system of claim 1, wherein the computer readable instructions, when executed by the one or more processing devices, cause the one or more processing devices to:
display the visual representation of the third item on a homepage with the split-screen presentation shown at a first size on the homepage; and
responsive to the user selection of the visual representation of the third item, display the split-screen presentation without the homepage at a second size that is larger than the first size.

9. The system of claim 8, wherein the primary display region and the secondary display region are shown proportionally smaller on the homepage when the split-screen presentation is shown at the first size on the homepage and proportionally larger when the split-screen presentation is shown at the second size without the homepage.

10. The system of claim 9, wherein the computer readable instructions, when executed by the one or more processing devices, cause the one or more processing devices to:
display the split-screen presentation in an upper left portion of the homepage prior to the user selection.

11. A computer-implemented method comprising:
displaying, on a display device, a split-screen presentation comprising a first item shown concurrently with a second item, the first item being shown in a snap mode occupying a relatively less prominent portion of the split-screen presentation and the second item being shown in a fill mode occupying a relatively more prominent portion of the split-screen presentation;
determining that a third item was most recently presented in the split-screen presentation in the snap mode;
responsive to determining that the third item was most recently presented in the split-screen presentation in the snap mode, designating the snap mode as a future presentation mode for the third item;
displaying a visual representation of the third item;
receiving a user selection of the visual representation of the third item; and
responsive to the user selection of the visual representation of the third item, replacing the first item in the split-screen presentation with the third item and retaining the second item in the split-screen presentation, the third item being presented in the snap mode.

12. The computer-implemented method of claim 11, the first item comprising a first application, the second item comprising a second application, and the third item comprising a third application.

13. The computer-implemented method of claim 12, wherein the first application and the third application are displayed in the snap mode in a rightmost region of the split-screen presentation that occupies less than half of the split-screen presentation, and the second application is displayed in the fill mode in a leftmost region of the split-screen presentation that occupies more than half of the split-screen presentation.

14. The computer-implemented method of claim 13, further comprising:
presenting the visual representation of the third application with a snap mode indicator that conveys that the third application will be displayed, upon receiving the user selection, in the snap mode in the rightmost region of the split-screen presentation.

15. The computer-implemented method of claim 14, further comprising:
presenting a plurality of favorite item tiles with the split-screen presentation, each favorite item tile representing a different favorite item,
wherein the visual representation of the third application is a particular favorite item tile.

16. The method of claim 12, the split-screen presentation comprising a side-by-side presentation with the first application and the second application being displayed side-by-side prior to receiving the user selection and the second application and the third application being displayed side-by-side after receiving the user selection.

17. The method of claim 12, the split-screen presentation comprising a side-by-side presentation with the first application being displayed to the right of the second application prior to receiving the user selection and the third application being displayed to the right of the second application after receiving the user selection.

18. A computer-readable storage medium storing instructions which, when executed by one or more processing devices, cause the one or more processing devices to perform acts comprising:
presenting a split-screen presentation having a first application shown concurrently with a second application on the split-screen presentation, the first application being presented in a snap mode occupying a relatively less prominent portion of the split-screen presentation and the second application being presented in a fill mode occupying a relatively more prominent portion of the split-screen presentation;
determining that a third application was most recently presented in the snap mode;
designating the snap mode as a future presentation mode for the third application responsive to determining that the third application was most recently presented in the snap mode;
presenting a visual representation of the third application with a presentation mode indicator indicating that, when the visual representation is selected, the third application will be presented in the snap mode;

receiving a user selection of the visual representation of the third application; and responsive to the user selection of the visual representation of the third application, presenting the third application in the split-screen presentation in the snap mode, the third application replacing the first application in the split-screen presentation and appearing concurrently with the second application.

19. The computer-readable storage medium of claim 18, the acts further comprising:

presenting a plurality of favorite item tiles with the split-screen presentation, each favorite item tile representing a different favorite item, wherein the visual representation of the third application is a particular favorite item tile.

20. The computer-readable storage medium of claim 18, the acts further comprising:

presenting a plurality of most-recently used item tiles with the split-screen presentation, each favorite item tile representing a different most-recently used item, wherein the visual representation of the third application is a particular most-recently used item tile.

\* \* \* \* \*